(12) United States Patent
Takeuchi

(10) Patent No.: US 12,248,072 B2
(45) Date of Patent: Mar. 11, 2025

(54) ELECTROMAGNETIC WAVE DETECTION APPARATUS AND INFORMATION ACQUISITION SYSTEM

(71) Applicant: KYOCERA Corporation, Kyoto (JP)

(72) Inventor: Eri Takeuchi, Yokohama (JP)

(73) Assignee: KYOCERA Corporation, Kyoto (JP)

(*) Notice: Subject to any disclaimer, the term of this patent is extended or adjusted under 35 U.S.C. 154(b) by 1100 days.

(21) Appl. No.: 17/258,784

(22) PCT Filed: Jul. 17, 2019

(86) PCT No.: PCT/JP2019/028105
§ 371 (c)(1),
(2) Date: Jan. 8, 2021

(87) PCT Pub. No.: WO2020/022146
PCT Pub. Date: Jan. 30, 2020

(65) Prior Publication Data
US 2021/0302589 A1    Sep. 30, 2021

(30) Foreign Application Priority Data

Jul. 27, 2018 (JP) ................. 2018-141356

(51) Int. Cl.
*G01S 17/894* (2020.01)
*G01S 7/481* (2006.01)
*G02B 5/20* (2006.01)

(52) U.S. Cl.
CPC .......... *G01S 17/894* (2020.01); *G01S 7/4817* (2013.01); *G02B 5/208* (2013.01)

(58) Field of Classification Search
None
See application file for complete search history.

(56) References Cited

U.S. PATENT DOCUMENTS 3,602,637 A * 8/1971 Katsuta ............... G02B 27/145
348/338
9,689,667 B2   6/2017 Royo Royo et al.
(Continued)

FOREIGN PATENT DOCUMENTS

EP    2 042 909 A2    4/2009
EP    2 458 424 A1    5/2012
(Continued)

*Primary Examiner* — Luke D Ratcliffe
*Assistant Examiner* — Jempson Noel
(74) *Attorney, Agent, or Firm* — Studebaker Brackett PLLC

(57) ABSTRACT

An electromagnetic wave detection apparatus 100 includes a wavelength separator 123 having a transmittance of electromagnetic waves in a first wavelength band larger than a transmittance of electromagnetic waves in a wavelength band other than the first wavelength band, a wavelength selector 124 having a transmittance of electromagnetic waves in a second wavelength band larger than a transmittance of electromagnetic waves in a wavelength band other than the second wavelength band, and a first detector 130 configured to detect electromagnetic waves progressing via the wavelength separator 123 and the wavelength selector 124. The first wavelength band and the second wavelength band partially overlap with each other.

14 Claims, 36 Drawing Sheets

(56) References Cited

U.S. PATENT DOCUMENTS

| | | | |
|---|---|---|---|
| 2005/0275959 A1* | 12/2005 | Kawaai | G02B 5/04 359/834 |
| 2009/0086324 A1* | 4/2009 | Saita | G02B 27/1013 359/589 |
| 2011/0235017 A1 | 9/2011 | Iwasaki | |
| 2012/0038817 A1* | 2/2012 | McMackin | H04N 25/00 348/E5.045 |
| 2014/0240721 A1 | 8/2014 | Herschbach | |
| 2015/0043009 A1* | 2/2015 | Bridges | G01S 7/4815 356/610 |
| 2015/0156479 A1 | 6/2015 | You et al. | |
| 2015/0378023 A1 | 12/2015 | Royo Royo et al. | |
| 2017/0035700 A1 | 2/2017 | Zhang | |
| 2019/0170647 A1* | 6/2019 | Ikenaga | A61B 1/00186 |

FOREIGN PATENT DOCUMENTS

| | | |
|---|---|---|
| EP | 2 469 860 A1 | 6/2012 |
| EP | 2 873 986 A1 | 5/2015 |
| JP | 2001-108617 A | 4/2001 |
| JP | 2002-077897 A | 3/2002 |
| JP | 2004-325397 A | 11/2004 |
| JP | 2006258464 A | 9/2006 |
| JP | 4401989 B2 | 1/2010 |
| JP | 2011199798 A | 10/2011 |
| JP | 2014512525 A | 5/2014 |
| JP | 2017124790 A | 7/2017 |
| JP | 2017-220439 A | 12/2017 |
| WO | 2017/040066 A1 | 3/2017 |
| WO | 2018034075 A1 | 2/2018 |

* cited by examiner

ELECTROMAGNETIC WAVE DETECTION APPARATUS AND INFORMATION ACQUISITION SYSTEM

CROSS REFERENCE TO RELATED APPLICATION

This application claims priority to and the benefit of Japanese Patent Application No. 2018-141356 filed on Jul. 27, 2018, the entire contents of which are incorporated herein by reference.

TECHNICAL FIELD

The present disclosure relates to an electromagnetic wave detection apparatus and an information acquisition system.

BACKGROUND

PTL 1 set forth below describes a system that acquires three-dimensional image information regarding a measurement target by irradiating the measurement target with laser light in a particular wavelength band and detecting reflected light of the laser light reflected on the measurement target.

CITATION LIST

Patent Literature

PTL 1: Japanese Patent No. 4401989

SUMMARY

An electromagnetic wave detection apparatus according to an embodiment includes a first transmission unit having a transmittance of electromagnetic waves in a first wavelength band larger than a transmittance of electromagnetic waves in a wavelength band other than the first wavelength band, a second transmission unit having a transmittance of electromagnetic waves in a second wavelength band larger than a transmittance of electromagnetic waves in a wavelength band other than the second wavelength band, and a first detector configured to detect electromagnetic waves progressing via the first transmission unit and the second transmission unit. The first wavelength band and the second wavelength band partially overlap with each other.

An information acquisition system according to an embodiment includes the electromagnetic wave detection apparatus described above and a controller configured to acquire information regarding the surroundings of the electromagnetic wave detection apparatus, based on a detection result of electromagnetic waves by the first detector.

Although the apparatus and the system have been described above as the solutions according to the present disclosure, it should be understood that the present disclosure can also be realized by modes that include them, or a method, a program, or a storage medium that stores a program substantially corresponding to them, which are thus included in the scope of the present disclosure.

DETAILED DESCRIPTION

In an apparatus as described above that receives electromagnetic waves in a particular wavelength band and guides them to a detector configured to detect electromagnetic waves, it is beneficial that the detector obtains a receiving signal in good condition. According to an embodiment, a detector can obtain a light receiving signal in good condition.

Hereinafter, embodiments of an electromagnetic wave detection apparatus and an information acquisition system, to which the present disclosure is applied, will be described with reference to the drawings.

Figure 1:
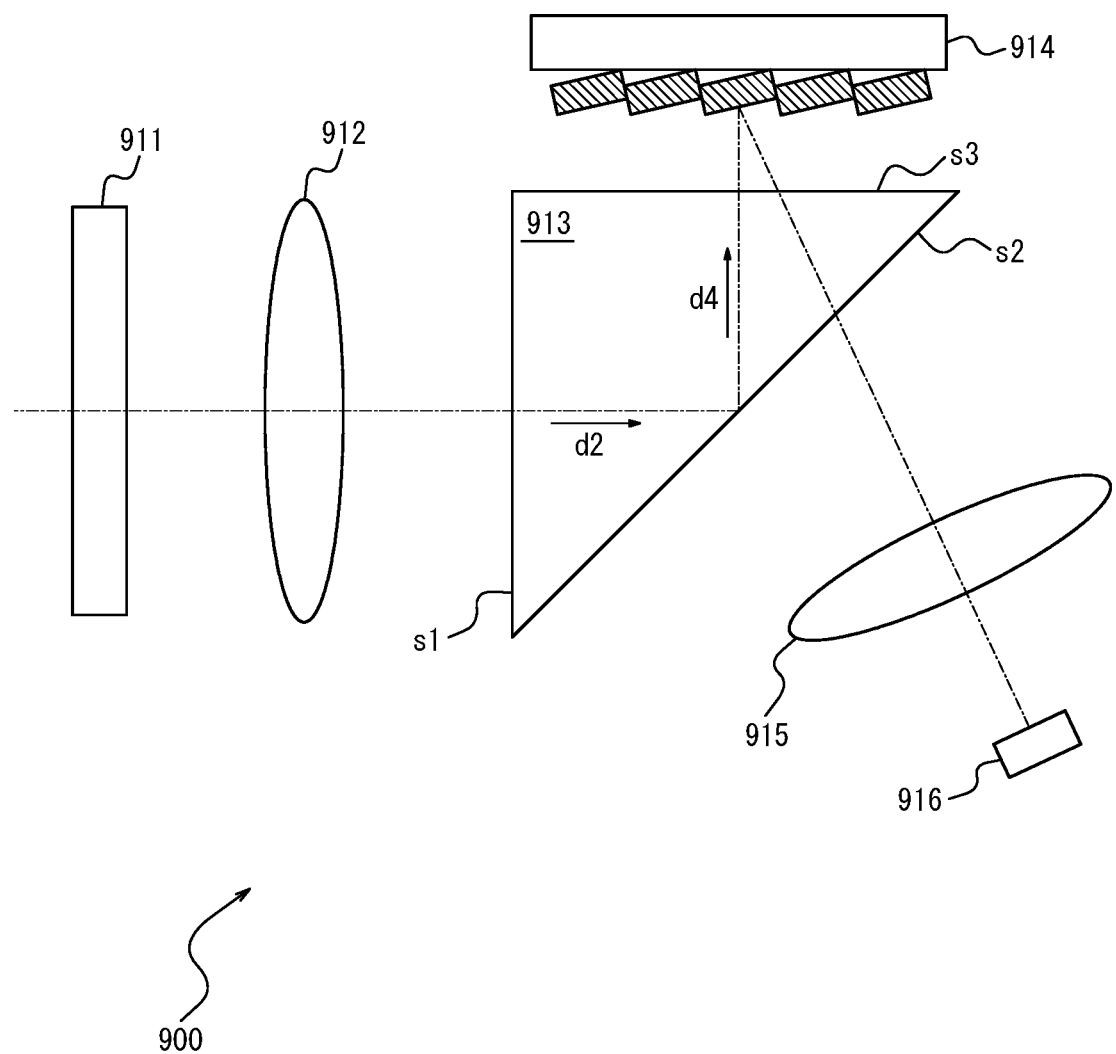
FIG. 1 is a diagram illustrating a schematic configuration of a conventional electromagnetic wave detection apparatus.

FIG. 1 is a diagram illustrating a schematic configuration of an electromagnetic wave detection apparatus 900 that irradiates an object with electromagnetic waves in a particular wavelength band, receives electromagnetic waves reflected by the object, and then guides the electromagnetic waves to a detector configured to detect electromagnetic waves, as disclosed in the PTL 1.

The electromagnetic wave detection apparatus 900 illustrated in FIG. 1 includes a bandpass filter 911, a first image forming unit 912, a prism 913, a progression unit 914, a second image forming unit 915, and a detector 916.

The bandpass filter 911 is a narrow band filter that transmits electromagnetic waves in a particular wavelength band and blocks electromagnetic waves in another wavelength band. The bandpass filter 911 transmits electromagnetic waves in the same wavelength band as the electromagnetic waves radiated to the object.

The first image forming unit 912 causes electromagnetic wave having been transmitted through the bandpass filter 911 to progress to a first surface s1 of the prism 913 to form an image of the object.

The prism 913 emits electromagnetic waves progressing from the first image forming unit 912 to the progression unit 914. Further, the prism 913 emits electromagnetic waves whose progression direction is changed by the first progression unit 914 to the second image forming unit 915. The prism 913 includes the first surface s1, a second surface s2, and a third surface s3. The first surface s1, the second surface s2, and the third surface s3 may intersect with each other.

The first surface s1 causes electromagnetic waves progressing from the first image forming unit 912 to progress in a second direction d2. The second surface s2 causes electromagnetic waves progressing in the second direction d2 to progress in a fourth direction d4. Further, the second surface s2 emits electromagnetic waves caused to progress in a particular direction by the progression unit 914, which will be described later. The third surface s3 emits electromagnetic waves progressing in the fourth direction d4. Further, the third surface s3 causes electromagnetic waves caused to progress in the particular direction by the progression unit 914 to be re-incident on the prism 913.

The progression unit 914 causes electromagnetic waves emitted from the third surface s3 of the prism 913 to progress in the particular direction. The second image forming unit 915 causes an image of the object as electromagnetic waves emitted from the second surface s2 of the prism 913 to progress to the detector 916 for image formation. The detector 916 detects electromagnetic waves progressing via the second image forming unit 915.

In the electromagnetic wave detection apparatus 900 illustrated in FIG. 1, by arranging the bandpass filter 911 in front of the first image forming unit 912, electromagnetic waves in a wavelength band other than the particular wavelength band are blocked to suppress unnecessary light from being incident on the detector 916.

Figure 2:
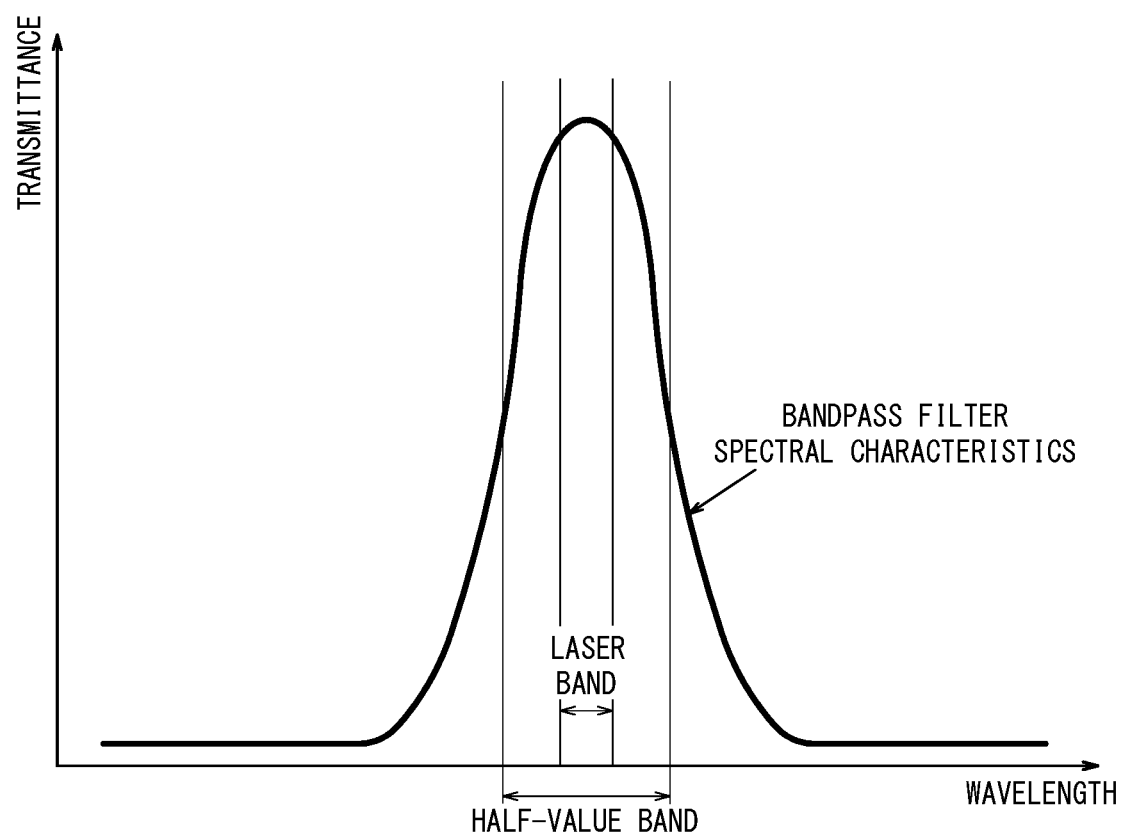
FIG. 2 is a diagram illustrating spectral characteristics of a general bandpass filter.

FIG. 2 is a diagram illustrating spectral characteristics of a general bandpass filter. In FIG. 2, a vertical axis represents a transmittance. A horizontal axis represents a wavelength band.

In general, it is difficult to narrow a half-value band or sharpen the rise of spectral characteristics using a bandpass filter. Thus, a detector receives electromagnetic waves having a large amount of light that causes a noise, in addition to radiation light radiated to an object, whereby a light receiving S/N ratio is reduced. A design aiming to narrow the half-value band of the bandpass filter causes a reduction in a level of a light receiving signal detected by the detector. Accordingly, the configuration in which the bandpass filter 911 is arranged in a manner as illustrated in FIG. 1 causes a reduction in the light receiving S/N ratio and the level of the light receiving signal, whereby inhibiting obtainment of a receiving signal in good condition.

Figure 3:
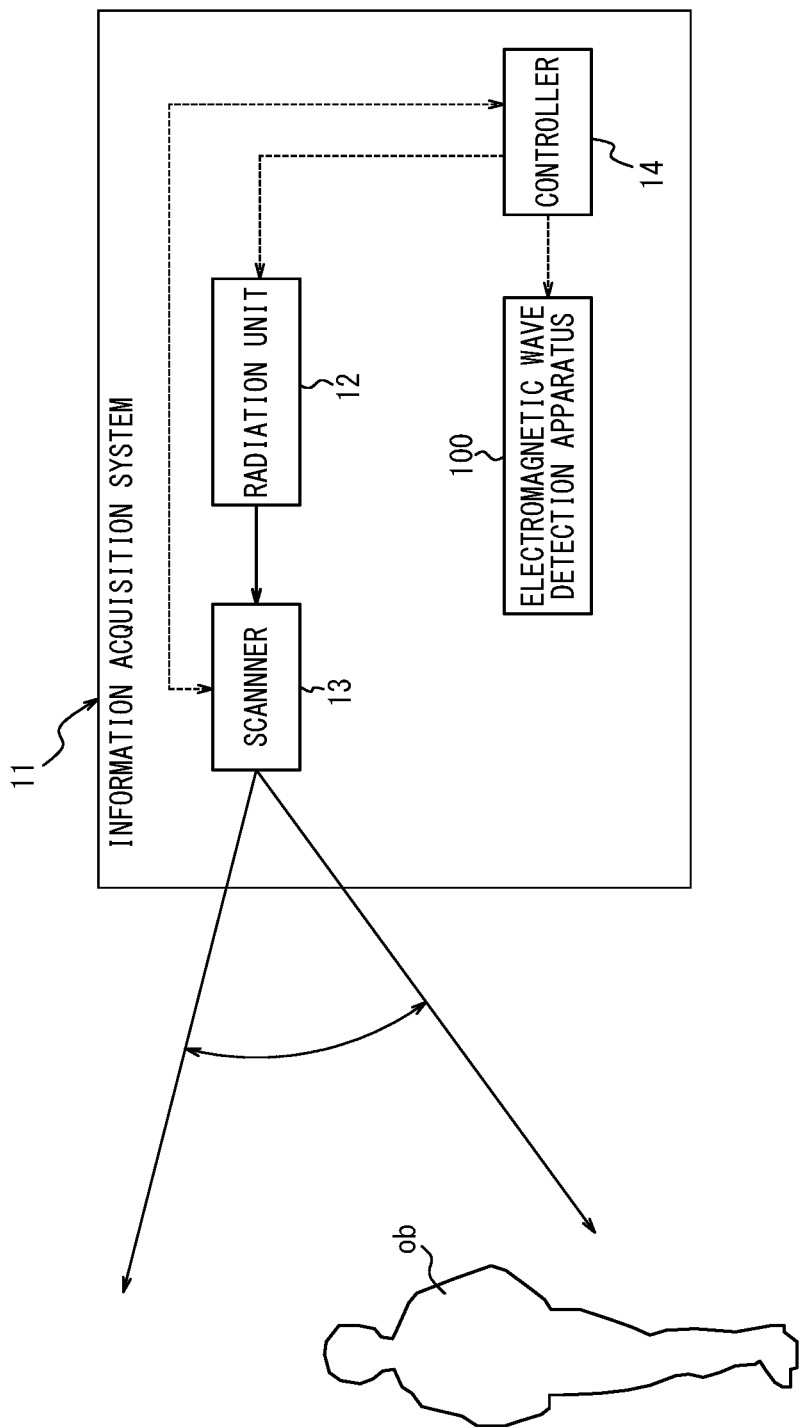
FIG. 3 is a diagram illustrating a schematic configuration of an information acquisition system that includes an electromagnetic wave detection apparatus according to a first embodiment of the present disclosure.

An information acquisition system 11 including an electromagnetic wave detection apparatus 100 according to a first embodiment of the present disclosure includes the electromagnetic wave detection apparatus 100, a radiation unit 12, a scanner 13, and a controller 14, as illustrated in FIG. 3. In FIG. 3, a broken line connecting each functional block indicates a flow of a control signal or communicated information. The communication indicated by the broken line may be wired communication or wireless communication. A solid line protruding from each functional block indicates a beam of electromagnetic waves.

The radiation unit 12 may radiate at least one of, for example, infrared rays, visible rays, ultraviolet rays, and radio waves. The radiation unit 12 may irradiate an object ob with electromagnetic waves, directly or indirectly via the scanner 13.

The radiation unit 12 may radiate a narrow laser of electromagnetic waves having a beam spread of, for example, 0.5°. The radiation unit 12 can radiate electromagnetic waves in pulses. For example, the radiation unit 12 includes, for example, an LED (Light Emitting Diode) or an LD (Laser Diode). The radiation unit 12 may switch between radiating and not radiating electromagnetic waves, based on control by the controller 14, as will be described below.

For example, the scanner 13 may include a reflector to reflect electromagnetic waves. The scanner 13 may change an irradiation location of electromagnetic waves to irradiate the object ob by reflecting electromagnetic waves radiated from the radiation unit 12 while changing the direction thereof. That is, the scanner 13 may scan the object ob using electromagnetic waves radiated from the radiation unit 12. The scanner 13 may scan the object ob in one-dimension or in two-dimensions.

The scanner 13 may be configured such that at least a portion of an irradiation region of electromagnetic waves that are radiated from the radiation unit 12 and reflected by a reflection surface is included in a detection region of electromagnetic waves in the electromagnetic wave detection apparatus 100. Thus, at least some of electromagnetic waves radiated to an object ob via the scanner 13 can be detected by the electromagnetic wave detection apparatus 100.

The scanner 13 includes, for example, a MEMS (Micro Electro Mechanical Systems) mirror, a polygon mirror, a galvano mirror, or the like.

The scanner 13 may change a reflection direction of electromagnetic waves, based on control by the controller 14, which will be described later. The scanner 13 may include an angle sensor such as, for example, an encoder. The scanner 13 may notify the controller 14 of an angle detected by the angle sensor as direction information associated with a direction to reflect electromagnetic waves. The controller 14 can calculate the irradiation location, based on the direction information acquired from the scanner 13. Alternatively, the controller 14 can calculate the irradiation location, based on a driving signal input to the scanner 13 to control the direction to reflect electromagnetic waves.

The electromagnetic wave detection apparatus 100 detects electromagnetic waves arriving from the object ob. In particular, the electromagnetic wave detection apparatus 100 detects electromagnetic waves emitted from the radiation unit 12 and reflected by the object ob. The electromagnetic wave detection apparatus 100 may detect electromagnetic waves emitted by the object ob. A configuration of the electromagnetic wave detection apparatus 100 will be described later.

The controller 14 includes one or more processors and a memory. The processor may include a general purpose processor configured to read a specific program and perform a specific function, or a specialized processor dedicated for specific processing. The specialized processor may include an ASIC (Application Specific Integrated Circuit). The processor may include a PLD (Programmable Logic Device). The PLD may include an FPGA (Field-Programmable Gate Array). The controller 14 may include at least one of a SoC (System-on-a-Chip) that includes one or more cooperating processors or a SiP (System in a Package).

The controller 14 may acquire information regarding the surroundings of the electromagnetic wave detection apparatus 100, based on a detection result of electromagnetic waves by the detector included in the electromagnetic wave detection apparatus 100, which will be described later. The information regarding the surroundings is, for example, image information, distance information, temperature information, or the like.

The controller 14 acquires the distance information using, for example, a ToF (Time-of-Flight) method. In particular, the controller 14 includes, for example, a time measurement LSI (Large Scale Integrated Circuit) and calculates a time $\Delta T$ from a time T1 at which the radiation unit 12 radiates electromagnetic waves to a time T2 at which the electromagnetic wave detection apparatus 100 detects reflected waves reflected at an irradiation position where the electromagnetic waves are radiated. The controller 14 calculates a distance to the irradiation position by multiplying the time $\Delta T$ by a speed of light and then dividing an acquired result by 2. The controller 14 calculates the irradiation position of electromagnetic waves, based on direction information acquired from the scanner 13 or a driving signal output to the scanner 13 by the controller 14. The controller 14 acquires the distance information in the form of an image by calculating a distance to each irradiation position while changing the irradiation position of electromagnetic waves.

Although the information acquisition system 11 has been described in the present embodiment with reference to an example in which the distance information is acquired using the Direct ToF to directly calculate the time from radiation of electromagnetic waves to return of the electromagnetic waves, this is not restrictive. The information acquisition system 11 may acquire the distance information using Flash TOF to indirectly calculate the return time of electromagnetic waves from a phase difference between electromagnetic waves radiated at prescribed intervals and returned electromagnetic waves. The information acquisition system 11 may acquire the distance information using another ToF method such as, for example, Phased ToF.

Next, the configuration of the electromagnetic wave detection apparatus 100 according to the present embodiment will be described with reference to FIG. 4.

Figure 4:
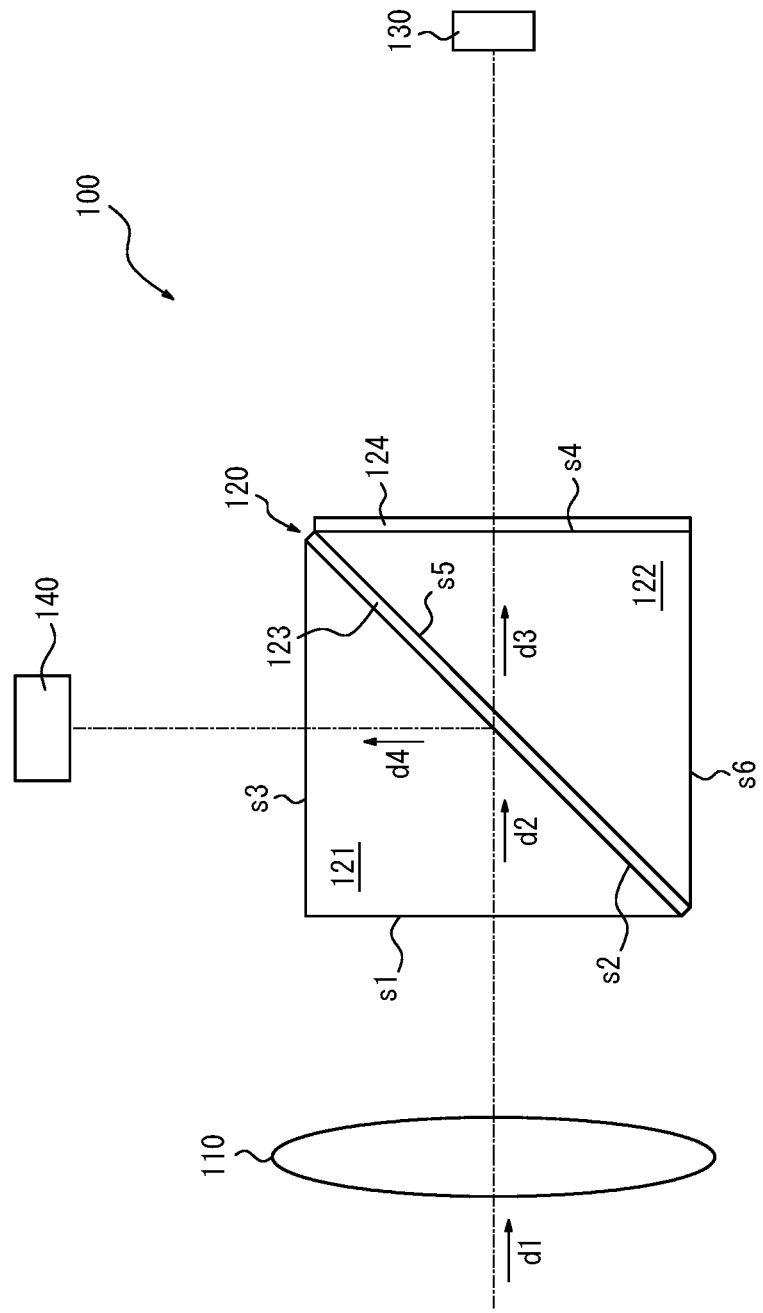
FIG. 4 is a diagram illustrating an example of a schematic configuration of the electromagnetic wave detection apparatus illustrated in FIG. 3.

The electromagnetic wave detection apparatus 100 according to the present embodiment includes a first image forming unit 110, a prism 120, a first detector 130, and a second detector 140, as illustrated in FIG. 4.

The first image forming unit 110 includes, for example, at least one of a lens and a mirror. The first image forming unit 110 causes an image of electromagnetic waves of an object ob serving as a subject incident from a first direction d1 to progress to a first surface s1 of the prism 120 and to be formed at a location remote from the first surface s1. The first direction d1 is parallel to a principal axis of the first image forming unit 110 and includes a direction directed to the first image forming unit 110 from an object plane and a direction directed to an image plane from the first image forming unit 110.

The prism 120 separates electromagnetic waves progressing from the first image forming unit 110 and emits them to the first detector 130 and the second detector 140. The prism 120 includes a first prism 121, a second prism 122, a wavelength separator 123, and a wavelength selector 124.

The first prism 121 may contain the first surface s1, a second surface s2, and a third surface s3 as different surfaces. The first prism 121 includes, for example, a triangular prism. The first surface s1, the second surface s2, and the third surface s3 may intersect with each other.

The first surface s1 causes electromagnetic waves incident on the prism 120 from the first direction d1 to progress in a second direction d2. The first surface s1 may be perpendicular to a progression axis of electromagnetic waves incident on the first surface s1 from the first direction d1. Because the first direction d1 is parallel to the principal axis of the first image forming unit 110 as described above, the principal axis of the first image forming unit 110 and the first surface s1 may be perpendicular to each other, in other words, a principal plane of the image forming unit 110 and the first surface s1 may be parallel to each other. The first surface s1 may transmit or refract electromagnetic waves incident from the first direction d1 and cause the electromagnetic waves to progress in the second direction d2.

The third surface s3 emits electromagnetic waves caused to progress in a fourth direction d4 by the wavelength separator 123, which will be described later. The third surface s3 may be perpendicular to a progression axis of electromagnetic waves progressing in the fourth direction d4, that is, perpendicular to the third direction d3.

The first prism 121 may be arranged such that the progression axis of electromagnetic waves incident on the first surface s1 from the first direction d1 and the first surface s1 are perpendicular to each other. The first prism 121 may be arranged such that the second surface s2 is positioned in a progression direction of electromagnetic waves progressing within the first prism 121 after being transmitted through or refracted by the first surface s1 from the first direction d1.

The second prism 122 may contain a fourth surface s4, a fifth surface s5, and a sixth surface s6 as different surfaces. The second prism 122 includes, for example, a triangular prism. The fourth surface s4, the fifth surface s5, and the sixth surface s6 may intersect with one another.

The fourth surface s4 emits electromagnetic waves caused to progress in the third direction d3 by the wavelength separator 123, which will be described later. The fourth surface s4 may be perpendicular to a progression axis of electromagnetic wave progressing in the fourth direction d4, that is, perpendicular to the fourth direction d4.

The second prism 122 may be arranged such that the fifth surface s5 is parallel to and opposes the second surface s2 of the first prism 121. The second prism 122 may be arranged such that the fourth surface s4 is positioned in the progression direction of electromagnetic waves progressing into the second prism 122 via the fifth surface s5.

The wavelength separator 123 serving as a first transmission unit is arranged between the second surface s2 of the first prism 121 and the fifth surface s5 of the second prism 122. The wavelength separator 123 is formed from, for example, a single-layer or multi-layer thin film deposited on the second surface s2 or the fifth surface s5. The wavelength separator 123 transmits electromagnetic waves in a first wavelength band and reflects electromagnetic waves in a wavelength band other than the first wavelength band. That is, the wavelength separator 123 has a transmittance of electromagnetic waves in the first wavelength band larger than a transmittance of electromagnetic waves in a wavelength band other than the first wavelength band. The wavelength separator 123 transmits electromagnetic waves in the first wavelength band in the third direction d3 and reflects electromagnetic waves in a wavelength band other than the first wavelength band in the fourth direction d4. The wavelength separator 123 includes one of a long pass filter for transmitting electromagnetic waves in a wavelength band on a longer wavelength side from a predetermined cutoff wavelength, a short pass filter for transmitting electromagnetic waves in a wavelength band on a shorter wavelength side from the predetermined cutoff wavelength, and a bandpass filter. In the present embodiment, the wavelength separator 123 is a long pass filter.

The wavelength selector 124 serving as a second transmission unit is arranged on the fourth surface s4 of the second prism 122. The wavelength selector 124 is formed from a single-layer or multi-layer thin film deposited on the fourth surface s4. The wavelength selector 124 transmits electromagnetic waves in a second wavelength band. That is, the wavelength selector 124 has a transmittance of electromagnetic waves in the second wavelength band larger than a transmittance of electromagnetic waves in a wavelength band other than the second wavelength band. The wavelength selector 124 transmits electromagnetic waves in the second wavelength band, from among electromagnetic waves progressing in the third direction d3. The wavelength selector 124 includes one of a long pass filter, a short pass filter, and a bandpass filter. In the present embodiment, the wavelength selector 124 includes a short pass filter.

Figure 5:
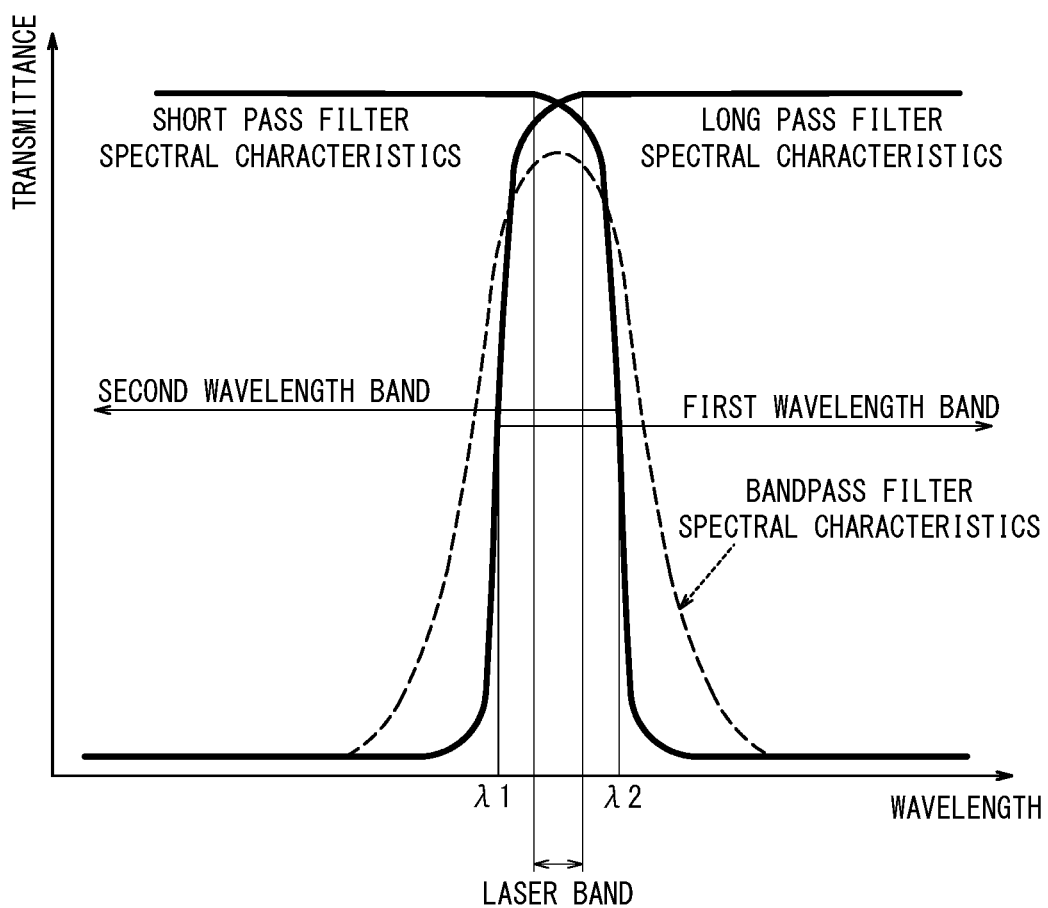
FIG. 5 is a diagram illustrating an example of spectral characteristics of a long pass filter serving as a wavelength separator and a short pass filter serving as a wavelength selector illustrated in FIG. 4.

FIG. 5 is a diagram illustrating spectral characteristics of the long pass filter serving as the wavelength separator 123 and the short pass filter as the wavelength selector 124.

As described above, the long pass filter transmits electromagnetic waves in a wavelength band on the longer wavelength side from the predetermined cutoff frequency. Thus, the wavelength separator 123 transmits electromagnetic waves in the first wavelength band, which is the wavelength band on the longer wavelength side than a predetermined cutoff frequency λ1, as illustrated in FIG. 5. The wavelength separator 123 has a reflectance of electromagnetic waves in a wavelength band other than the first wavelength band higher than a reflectance of electromagnetic waves in the first wavelength band.

As described above, further, the short pass filter transmits electromagnetic waves in a wavelength band on the shorter wavelength side from the predetermined cutoff frequency. Thus, the wavelength selector 124 transmits electromagnetic waves in the second wavelength band, which is a wavelength band on the shorter wavelength side from a predetermined cutoff frequency λ2, as illustrated in FIG. 5. Further, the wavelength selector 124 has a reflectance of electromagnetic waves in a wavelength band other than the second wavelength band higher than a reflectance of electromagnetic waves in the second wavelength band.

In the present embodiment, the cutoff frequency λ2 of the wavelength selector 124 is set to be larger than the cutoff frequency λ1 of the wavelength separator 123. Thus, the first wavelength band of electromagnetic waves transmitted by the wavelength separator 123 and the second wavelength band of electromagnetic waves transmitted by the wavelength selector 124 partially overlap with each other, as illustrated in FIG. 5. Accordingly, electromagnetic waves in a wavelength band in a region in which the first wavelength band and the second wavelength band overlap with each other are transmitted through the wavelength selector 124 and emitted to the first detector 130, which will be described later.

Here, in general, the rise of the spectral characteristics of a long pass filter and the fall of the spectral characteristics of a short pass filter can be set to be steeper than the rise and fall of the spectral characteristics of the bandpass filter indicated by the broken line in FIG. 5. Also, in general, a long pass filter and a short pass filter can have the respective transmittances larger than that of a bandpass filter. Thus, by adjusting the cutoff frequencies λ1 and λ2, a laser beam of electromagnetic waves in the wavelength band (a laser band) emitted by the radiation unit 12 can be selectively incident on the first detector 130. Accordingly, the electromagnetic wave detection apparatus 100 according to the present embodiment can suppress a reduction in the light receiving S/N ratio of the first detector 130 and a reduction in a level of the light receiving signal, whereby the first detector 130 can obtain a light receiving signal in good condition.

Further, by depositing the wavelength separator 123 and the wavelength selector 124 on the prism 120, Fresnel reflection at the filter surface can be suppressed. Thus, the electromagnetic wave detection apparatus 100 according to the present embodiment can secure the transmittances of electromagnetic waves, suppress the occurrence of ghosts, and shorten a back focus of an image forming lens.

Referring again to FIG. 4, the first detector 130 detects electromagnetic waves progressing via the wavelength separator 123 and the wavelength selector 124. In particular, the first detector 130 detects electromagnetic waves transmitted sequentially through the first wavelength separator 123 and the wavelength selector 124. Here, the wavelength band in which the first wavelength band and the second wavelength band overlap with each other and a wavelength band of electromagnetic waves detected by the first detector 130 at least partially overlap with each other. The wavelength band in which the first wavelength band and the second wavelength band overlap with each other may include the entire wavelength band of electromagnetic waves detected by the first detector 130. The wavelength band in which the first wavelength band and the second wavelength band overlap with each other may coincide with the wavelength band of electromagnetic waves detected by the first detector 130.

The first detector 130 includes an active sensor or a passive sensor that is configured to detect electromagnetic waves reflected from the target ob after being radiated to the object ob by the radiation unit 12. The first detector 130 may detect electromagnetic waves that are reflected from the object ob after being radiated by the radiation unit 12, reflected by the scanner 13, and then progress to the object ob.

The first detector 130 includes, in particular, an element constituting a distance measuring sensor. For example, the first detector 130 includes a single element such as an APD (Avalanche PhotoDiode), a PD (PhotoDiode), a SPAD (Single Photon Avalanche Diode), a millimeter wave sensor, a submillimeter wave sensor, or a ranging image sensor. The first detector 130 may include an element array such as an APD array, a PD array, an MPPC (Multi Photon Pixel Counter), a distance measuring imaging array, or a distance measuring image sensor. The first detector 130 may include at least one of the distance measuring sensor, an image sensor, and a temperature sensor.

The first detector 130 may transmit detection information indicating that reflected waves from the subject has been detected to the controller 14. The controller 14 acquires information regarding the surroundings of the electromagnetic wave detection apparatus 100, based on electromagnetic waves detected by the first detector 130. In particular, the controller 14 can acquire distance information of an irradiation position of electromagnetic waves radiated from the radiation unit 12 using, for example, the ToF method, based on the detection information transmitted from the first detector 130.

The second detector 140 detects electromagnetic waves emitted from the third surface s3 of the prism 121. That is, the second detector 140 detects electromagnetic waves reflected by the wavelength separator 123.

The second detector 140 includes a passive sensor. The second detector 140 includes, in particular, an element array. For example, the second detector 140 may include an image sensor or an imaging array, capture an image of electromagnetic waves formed on the detection surface, and generate image information corresponding to the captured object ob. The second detector 140 may capture an image of visible light. The second detector 140 may transmit the generated image information to the controller 14. The controller 14 acquires information regarding the surroundings of the electromagnetic wave detection apparatus 100, based on a detection result of electromagnetic waves by the second detector 140.

The second detector 140 may capture an image of infrared light, ultraviolet, radio waves, or the like rather than an image of visible light. The second detector 140 may include a distance measuring sensor. In this configuration, the electromagnetic wave detection apparatus 100 can acquire distance information in the form of an image using the second detector 140. The second detector 140 may include a distance measuring sensor, a temperature sensor, or the like. In this configuration, the electromagnetic wave detection apparatus 100 can acquire temperature information in the form of an image using the second detector 140.

The second detector 140 may include a sensor of a different type from or the same type as that of the first detector 19. The second detector 140 may detect electromagnetic waves of a different type from or the same type as electromagnetic waves detected by the first detector 19.

As described above, the electromagnetic wave detection apparatus 100 detects the reflected waves of electromagnetic waves radiated from the radiation unit 12 and reflected by the target ob. Further, the first detector 130 detects electromagnetic waves in the wavelength band in which the first wavelength band and the second wavelength band overlap with each other, from among the reflected waves. The wavelength band in which the first wavelength band and the second wavelength band overlap with each other and the wavelength band of electromagnetic waves radiated by the radiation unit 12 at least partially overlap with each other. The wavelength band in which the first wavelength band and the second wavelength band overlap with each other may include the entire wavelength band of electromagnetic waves radiated by the radiation unit 12. The wavelength band in which the first wavelength band and the second wavelength band overlap with each other may coincide with the wavelength band of electromagnetic waves radiated by the radiation unit 12.

Figure 6:
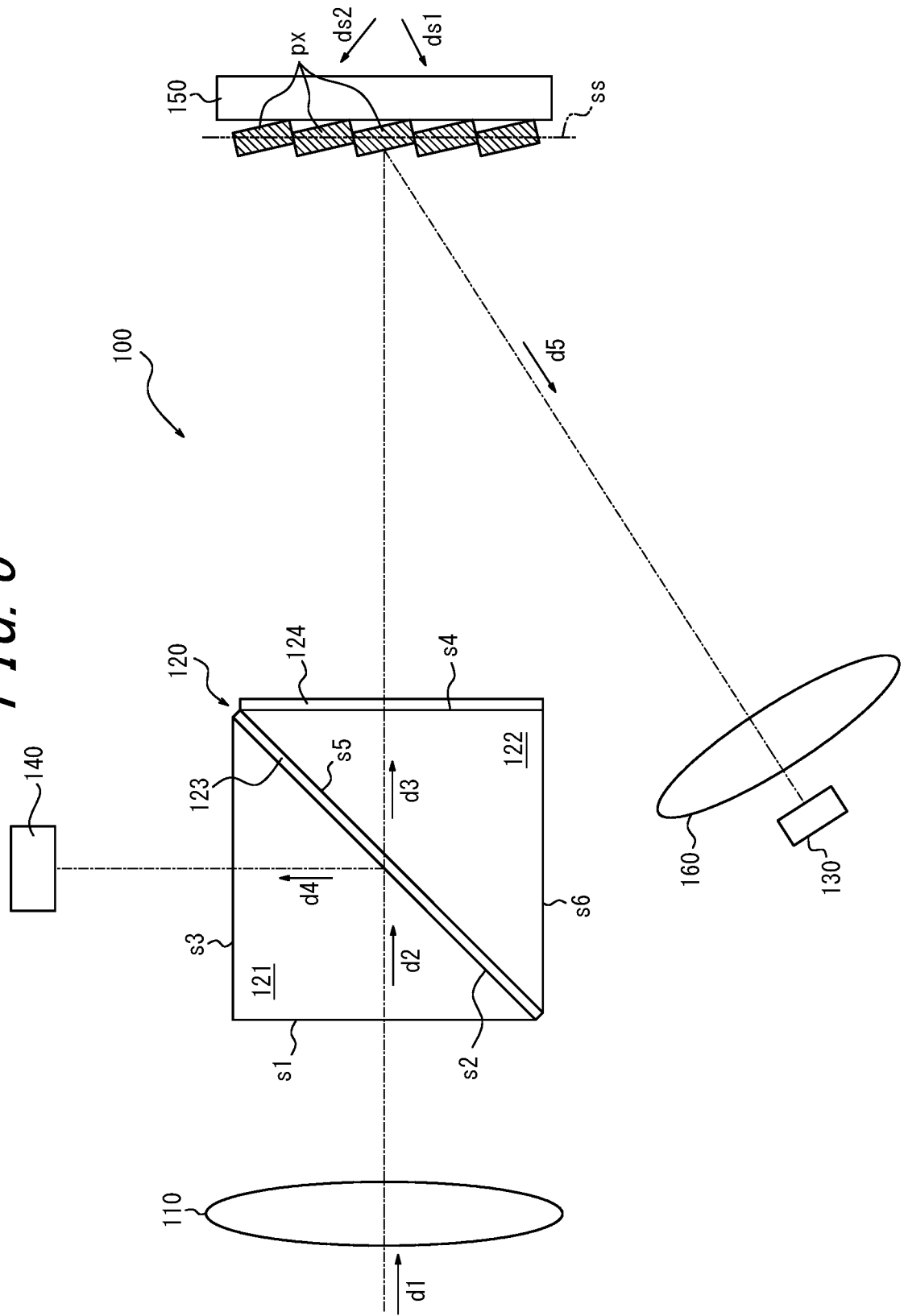
FIG. 6 is a diagram illustrating another example of the schematic configuration of the electromagnetic wave detection apparatus illustrated in FIG. 3.

The configuration of the electromagnetic wave detection apparatus 100 according to the present embodiment is not limited to the configuration illustrated in FIG. 3. The electromagnetic wave detection apparatus 100 according to the present embodiment may further include a first progression unit 150 and a second image forming unit 160, as illustrated in FIG. 6.

The first progression unit 150 is provided on a path of electromagnetic waves emitted from the fourth surface s4 of the prism 120. The first progression unit 150 may be provided at or in the vicinity of a primary imaging position of the target ob, which is positioned at a predetermined distance from the first image forming unit 110.

The first progression unit 150 has a reference surface ss on which electromagnetic waves are to be incident after having passed through the first image forming unit 110 and the prism 120. The reference surface ss is a surface that causes an action such as, for example, reflection and transmission of electromagnetic waves in at least one of a first state and a second state, which will be described below. The first progression unit 150 may form an image of electromagnetic waves of the object ob formed by the first image forming unit 110 on the reference surface ss. The reference surface ss may be perpendicular to a progression axis of electromagnetic waves emitted from the fourth surface s4.

The first progression unit 150 causes electromagnetic waves incident on the reference surface ss to progress in a particular direction. The first progression unit 150 includes a plurality of pixels px arranged along the reference surface ss. The first progression unit 150 can switch between the first state in which electromagnetic waves are caused to progress in a first selection direction ds1 serving as the particular direction and the second state in which electromagnetic waves are caused to progress in a second selection direction ds2 serving as another particular direction, for each of the pixels px. The first progression unit 150 causes electromagnetic waves incident on the reference surface ss after progressing via the wavelength separator 123 to progress in a fifth direction d5 serving as a particular direction, for each of the pixels px. The first state includes a first reflection state in which electromagnetic waves incident on the reference surface ss are reflected in the first selection direction ds1. The second state includes a second reflection state in which electromagnetic waves incident on the reference surface ss are reflected in the second selection direction ds2.

The first progression unit 150 may include a reflection surface that reflects electromagnetic waves for each of the pixels px. The first progression unit 150 may switch between the first reflection state and the second reflection state for each pixel px by changing an orientation of the reflection surface for each pixel px.

The first progression unit 150 may include, for example, a digital micromirror device (DMD; Digital Micromirror Device). The DMD can drive minute reflection surfaces constituting the reference surface ss such that the reflection surface for each of the pixels px is inclined at +12° or −12° with respect to the reference surface ss. The reference surface ss may be parallel to a plate surface of the substrate having the minute reflection surfaces of the DMD mounted thereon.

The first progression unit 150 may switch each of the pixels px between the first state and the second state, based on control by the controller 14. For example, the first progression unit 150 can switch some of the pixels px to the first state such that electromagnetic waves incident thereon are caused to progress in the first selection direction ds1 and switch other pixels px to the second state such that electromagnetic waves incident thereon are caused to progress in the second selection direction ds2.

The second image forming unit 160 may be provided on a path of electromagnetic waves caused to progress in the fifth direction d5 by the first progression unit 150. The second image forming unit 160 includes at least one of, for example, a lens and a mirror. The second image forming unit 160 may cause an image of the object ob as electromagnetic waves that have been primarily formed on the reference surface ss of the first progression unit 150 and then progressing in the fifth direction d5 to progress to the first detector 130 for image formation.

The first detector 130 detects electromagnetic waves caused to progress in the fifth direction d5 serving as the particular direction by the first progression unit 150. In particular, the first detector 130 detects electromagnetic waves that have been caused to progress in the particular direction by the first progression unit 150 and passed through the second image forming unit 160.

In the present embodiment, as described above, the electromagnetic wave detection apparatus 100 includes the wavelength separator 123 having the transmittance of electromagnetic waves in the first wavelength band larger than the transmittance of electromagnetic waves in a wavelength band other than the first wavelength band, a wavelength selector 124 having the transmittance of electromagnetic waves in the second wavelength band larger than the transmittance of electromagnetic waves in a wavelength band other than the second wavelength band, and the first detector 130 configured to detect electromagnetic waves progressing via the wavelength separator 123 and the wavelength selector 124. The first wavelength band and the second wavelength band at least partially overlap with each other.

In such a configuration, electromagnetic waves in a wavelength band limited by the first wavelength band and the second wavelength band are incident on the first detector 130. By limiting the wavelength band of electromagnetic waves to be incident on the first detector 130 using the wavelength separator 123 and the wavelength selector 124 that function as filters, a higher transmittance and a steeper spectral characteristics can be obtained, as compared to those in a case in which a wavelength band of electromagnetic waves to be incident on the first detector 130 is limited using a bandpass filter. Thus, the electromagnetic wave detection apparatus 100 according to the present embodiment can suppress a reduction in the light receiving S/N ratio of the first detector 130 and a reduction in the level of the light receiving signal, whereby the first detector 130 can obtain a light receiving signal in good condition.

In the information acquisition system 11 according to the present embodiment, further, the controller 14 acquires the information regarding the surroundings of the electromagnetic wave detection apparatus 100, based on electromagnetic waves detected by the first detector 130 and the second detector 140. Thus, the information acquisition system 11 can provide useful information based on the detected electromagnetic waves. Such a configuration and effect is also applicable to an information acquisition system of each embodiment described later.

Although the present embodiment has been described using an example in which the wavelength separator 123 is a long pass filter and the wavelength selector 124 is a short pass filter, a combination of the filters of the wavelength separator 123 and the wavelength selector 124 is not limited thereto. For example, the wavelength separator 123 may be a short pass filter, and the wavelength selector 124 may be a long pass filter.

Figure 7:
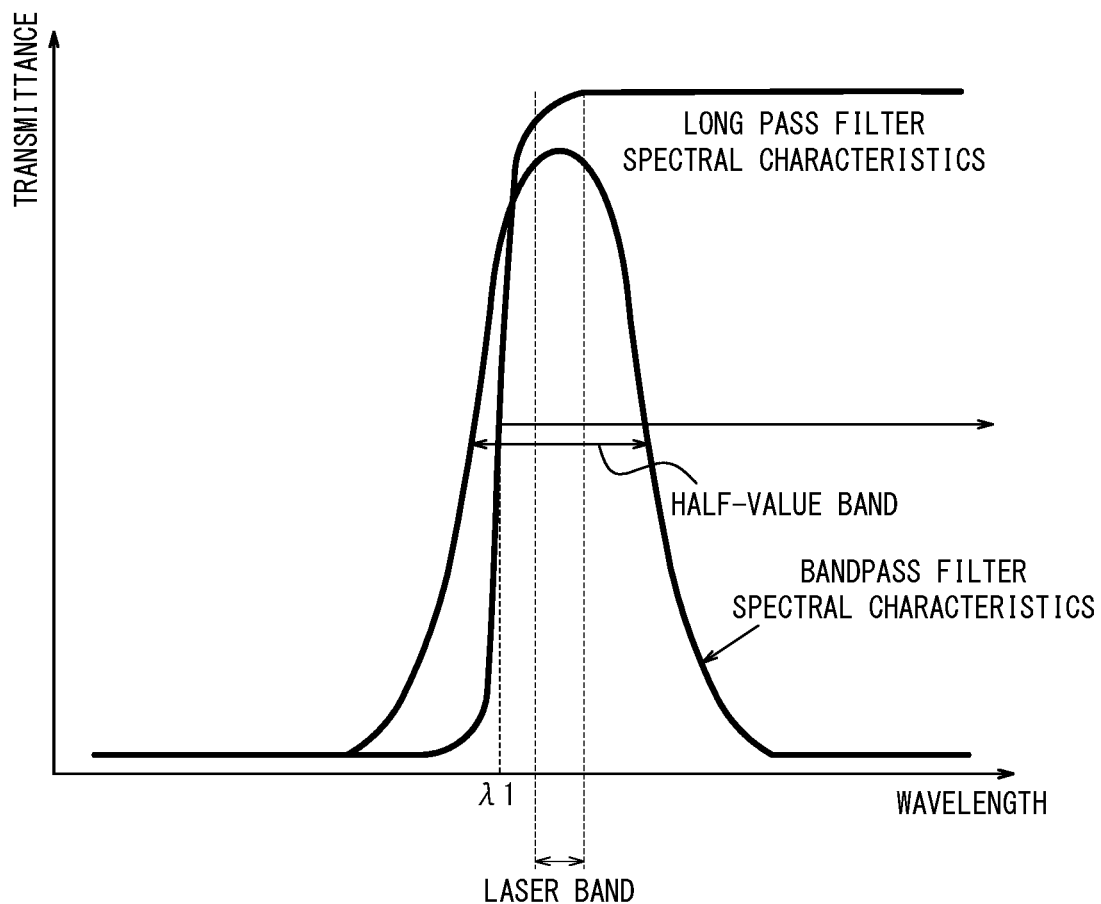
FIG. 7 is a diagram illustrating an example of the spectroscopic characteristics in a case in which one of the wavelength separator and the wavelength selector illustrated in FIG. 4 is a long pass filter and the other one is a bandpass filter.

One of the wavelength separator 123 and the wavelength selector 124 may be a long pass filter and the other one may be a bandpass filter. In this case, the cutoff frequency $\lambda 1$ of the long pass filter is set to be a frequency near the low frequency side of the laser band, as illustrated in FIG. 7. Also, a half-value band of the bandpass filter is set to include the laser band. In this way, electromagnetic waves in a wavelength band in which a wavelength band on the longer wavelength side from the cutoff frequency $\lambda 1$ and the half-value band of the bandpass filter overlap with each other can be incident on the first detector 130.

Figure 8:
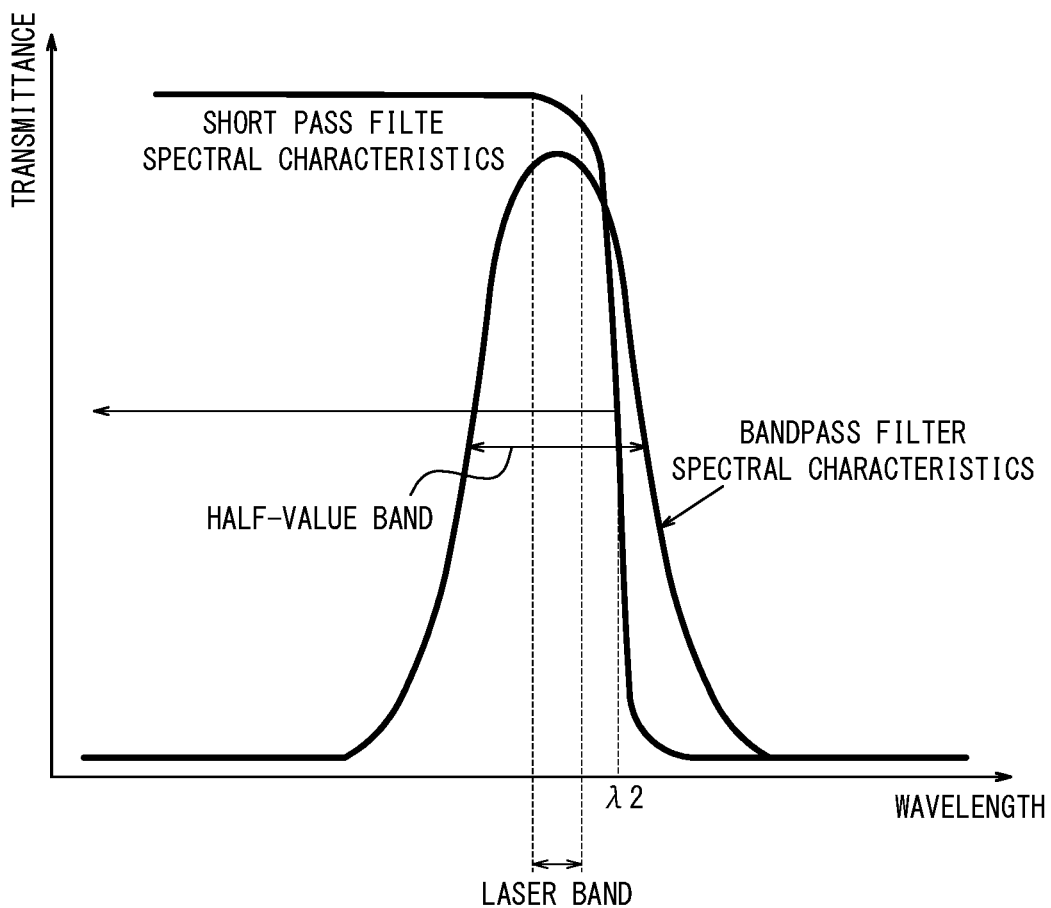
FIG. 8 is a diagram illustrating an example of the spectroscopic characteristics in a case in which one of the wavelength separator and the wavelength selector illustrated in FIG. 4 is a short pass filter and the other one is a bandpass filter.

One of the wavelength separator 123 and the wavelength selector 124 may be a short pass filter and the other one may be a bandpass filter. In this case, the cutoff frequency $\lambda 2$ of the short pass filter is set to be a frequency near the high frequency side of the laser band, as illustrated in FIG. 8. Also, the half-value band of the bandpass filter is set to include the laser band. In this way, electromagnetic waves in a wavelength band in which the wavelength band on the shorter wavelength side from the cutoff frequency $\lambda 2$ and the half-value band of the bandpass filter overlap with each other can be incident on the first detector 130.

Figure 9:
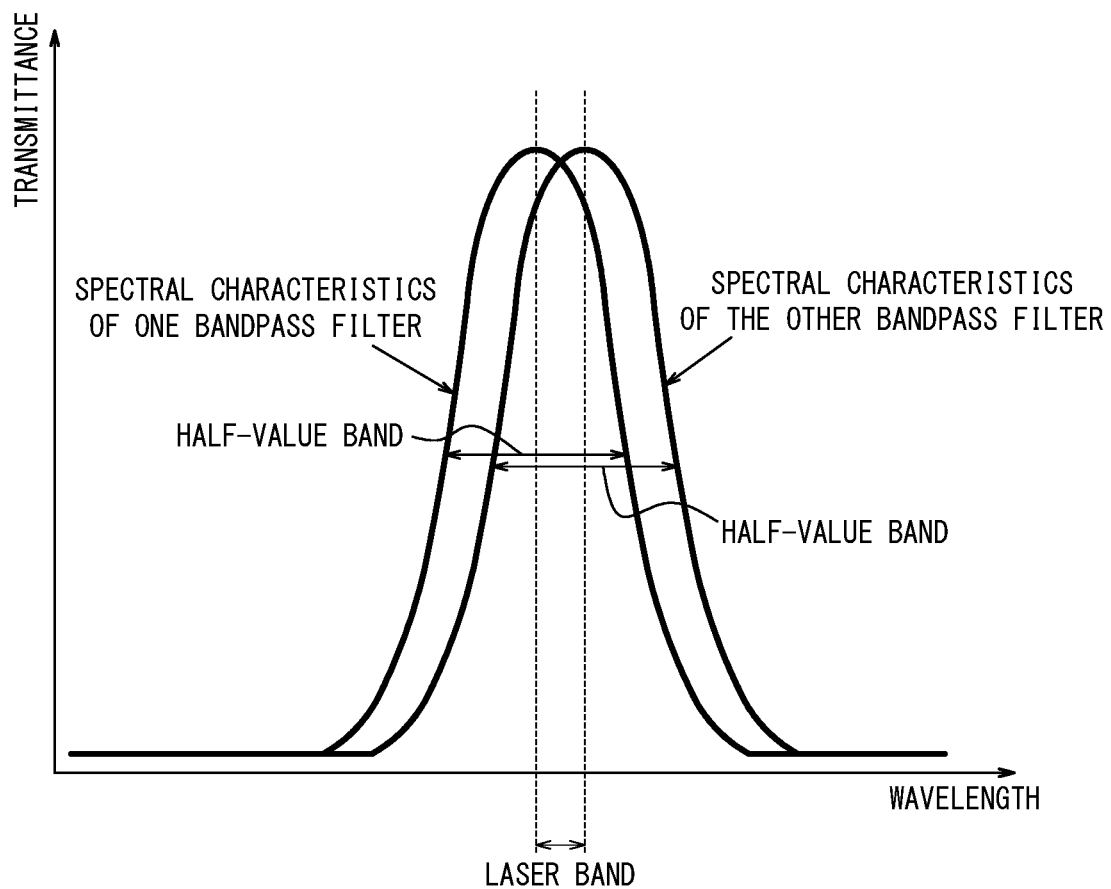
FIG. 9 a diagram illustrating an example of the spectroscopic characteristics in a case in which the wavelength separator and the wavelength selector illustrated in FIG. 4 are bandpass filters.

Both the wavelength separator 123 and the wavelength selector 124 may be bandpass filters. In this case, the half-value band of one of the bandpass filters and the half-value band of the other one of the bandpass filters are staggered such that the laser band is included in a wavelength band in which the half-value bands of both of the bandpass filters overlap with each other, as illustrated in FIG. 9. In this way, electromagnetic waves in the wavelength band in which the half-value bands of the two bandpass filters overlap with each other can be incident on the first detector 130.

Figure 10:
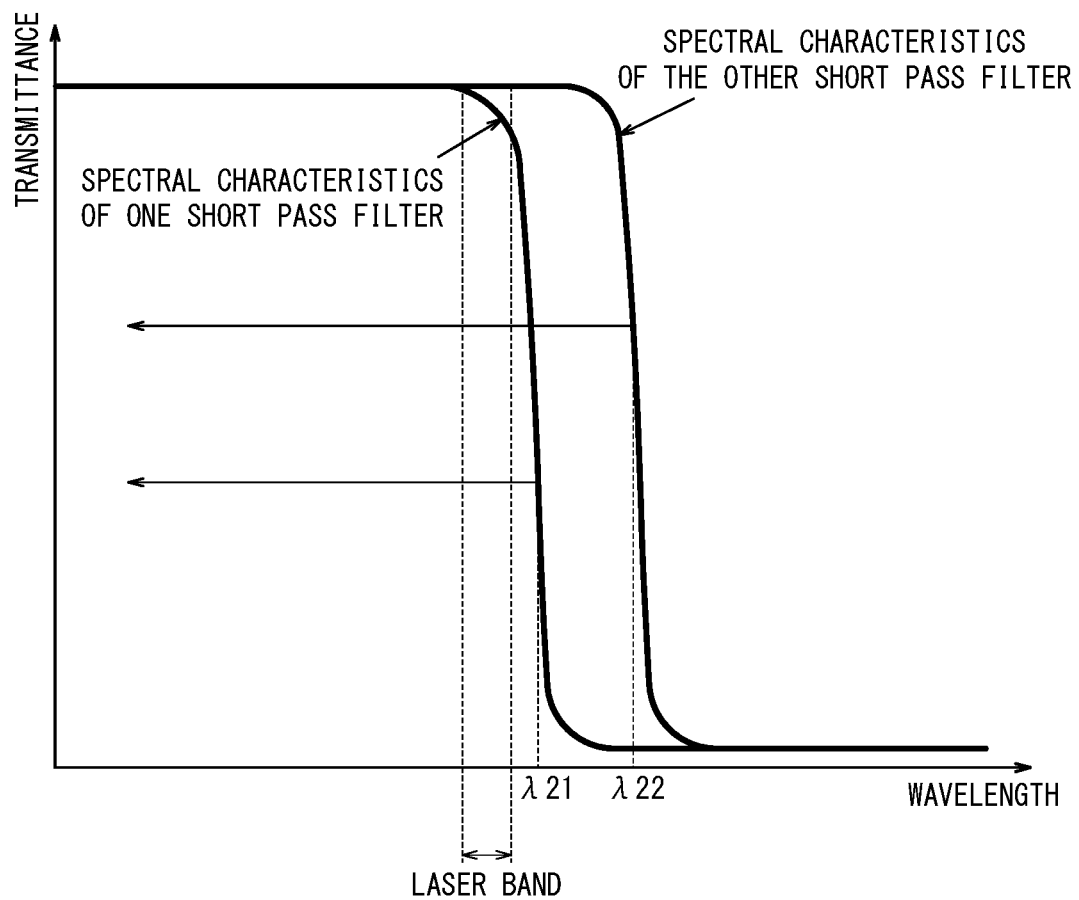
FIG. 10 is a diagram illustrating an example of the spectroscopic characteristics in a case in which the wavelength separator and the wavelength selector illustrated in FIG. 4 are short pass filters.

Both the wavelength separator 123 and the wavelength selector 124 may be short pass filters. In this case, the cutoff frequency $\lambda 21$ of one of the short pass filters is set to be a frequency near the high frequency side of the laser band, as illustrated in FIG. 10. Also, the cutoff frequency $\lambda 22$ of the other one of the short pass filters is set to be larger than the cutoff frequency $\lambda 21$ of the one of the short pass filters. In this way, electromagnetic waves in a wavelength band in which the wavelength band on the shorter wavelength side from the cutoff frequency $\lambda 21$ and the wavelength band on the shorter wavelength side from the cutoff frequency $\lambda 22$ overlap with each other can be incident on the first detector 130.

Figure 11:
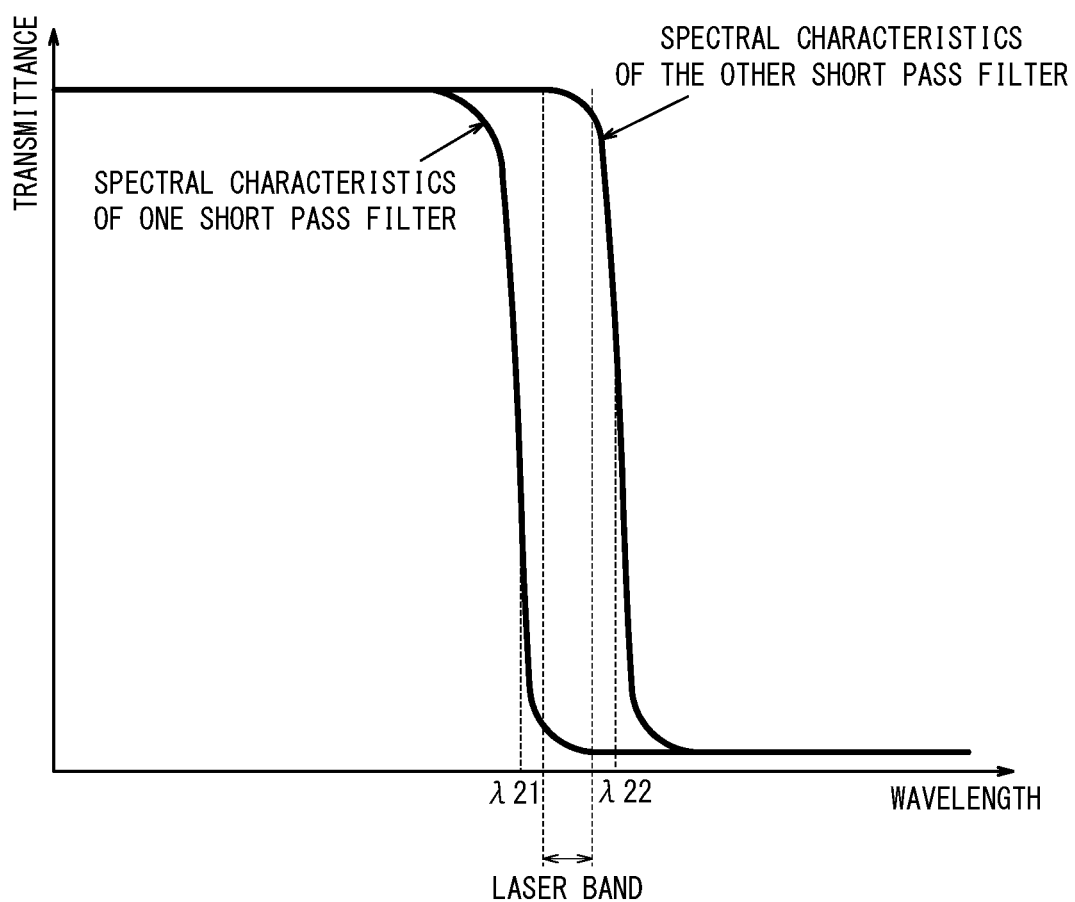
FIG. 11 is a diagram illustrating another example of the spectroscopic characteristics in a case in which the wavelength separator and the wavelength selector illustrated in FIG. 4 are short pass filters.

In a case in which both the wavelength separator 123 and the wavelength selector 124 are short pass filters, the cutoff frequency $\lambda 21$ of one of the short pass filters is set to be a frequency near the low frequency side of the laser band, and the cutoff frequency $\lambda 22$ of the other one of the short pass filters is set to be a frequency near the high frequency side of the laser band, as illustrated in FIG. 11. In this case, it is configured such that electromagnetic waves that have been reflected by one of the short pass filters and transmitted through the other one of the short pass filters are incident on the first detector 130. This configuration may be substantialized by, for example, tilting the wavelength separator 123 such that electromagnetic waves reflected by the wavelength selector 124 after being transmitted through the wavelength separator 123 are incident on the first detector 130. In this way, electromagnetic waves in the wavelength band in which the wavelength band on the longer wavelength side from the cutoff frequency $\lambda 21$ of one of the short pass filters and the wavelength band on the shorter wavelength side from the cutoff frequency $\lambda 22$ of the other one of the short pass filters overlap with each other can be incident on the first detector 130.

Figure 12:
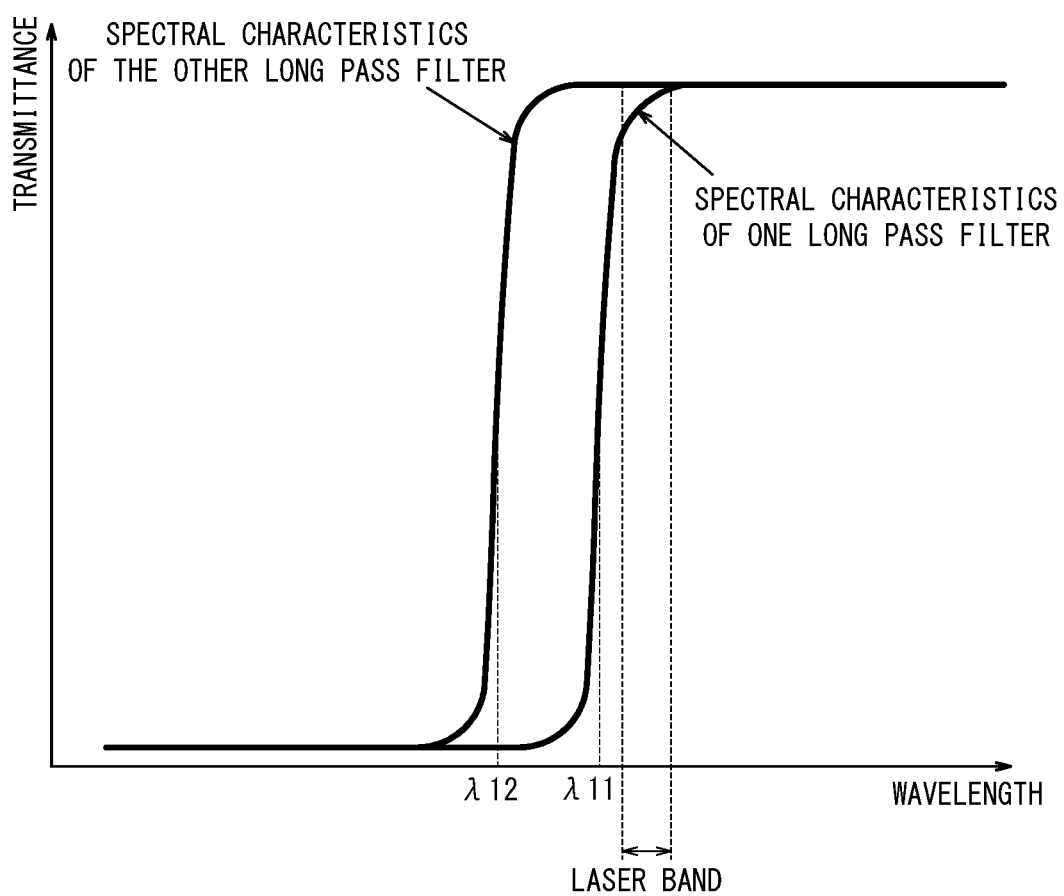
FIG. 12 is a diagram illustrating an example of the spectroscopic characteristics in a case in which the wavelength separator and the wavelength selector illustrated in FIG. 4 are long pass filters.

Both the wavelength separator 123 and the wavelength selector 124 may be long pass filters. In this case, the cutoff frequency $\lambda 11$ of one of the long pass filters is set to be a frequency near the low frequency side of the laser band, as illustrated in FIG. 12. Also, the cutoff frequency $\lambda 12$ of the other one of the short pass filters is set to be lower than the cutoff frequency $\lambda 11$ of the one of the short pass filters. In this way, electromagnetic waves in the wavelength band in which the wavelength band on the longer wavelength side from the cutoff frequency $\lambda 11$ and the wavelength band on the longer wavelength side from the cutoff frequency $\lambda 12$ overlap with each other can be incident on the first detector 130.

Figure 13:
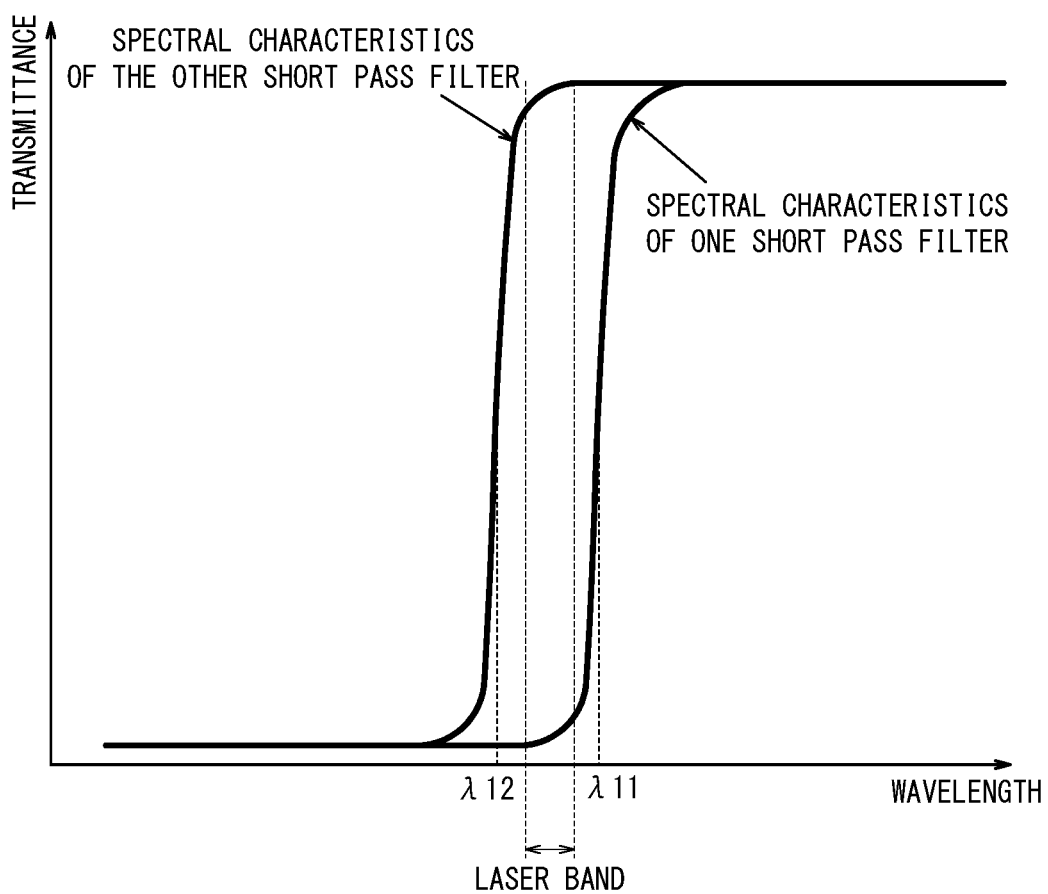
FIG. 13 is a diagram illustrating another example of the spectroscopic characteristics in a case in which the wavelength separator and the wavelength selector illustrated in FIG. 4 are long pass filters.

In a case in which both the wavelength separator 123 and the wavelength selector 124 are long pass filters, the cutoff frequency $\lambda 11$ of one of the long pass filters is set to be a frequency near the high frequency side of the laser band, and the cutoff frequency $\lambda 12$ of the other one of the long pass filters is set to be a frequency near the low frequency side of the laser band, as illustrated in FIG. 13. In this case, it is configured such that electromagnetic waves that have been reflected by the one of the long pass filters and transmitted through the other one of the long pass filters are incident on the first detector 130. This configuration may be substantialized by, for example, tilting the wavelength selector 124 such that electromagnetic waves having transmitted through the wavelength separator 123 and reflected by the wavelength selector 124 are incident on the first detector 130. In this way, electromagnetic waves in the wavelength band in which the wavelength band on the shorter wavelength side from the cutoff frequency $\lambda 11$ and the wavelength band on the longer wavelength side from the cutoff frequency $\lambda 12$ overlap with each other can be incident on the first detector 130.

Figure 14:
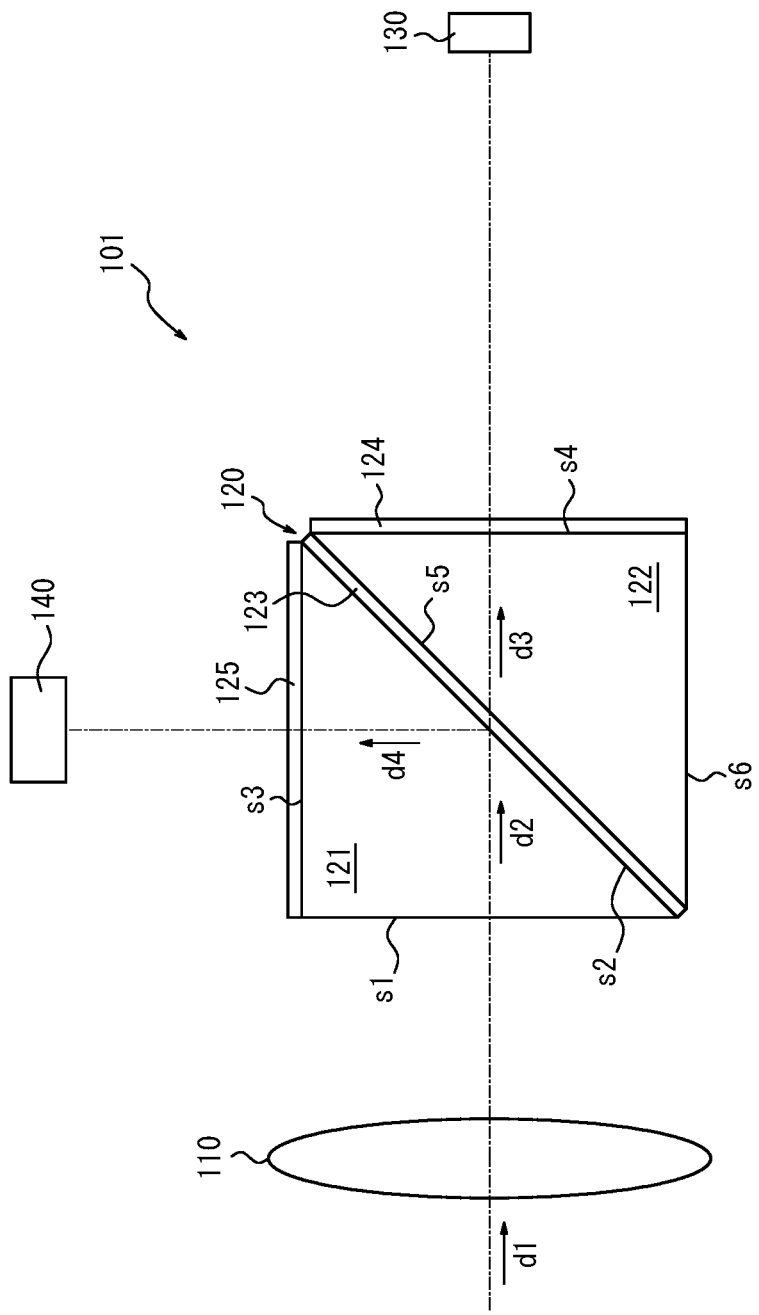
FIG. 14 is a diagram illustrating an example of a schematic configuration of an electromagnetic wave detection apparatus according to a second embodiment of the present disclosure.

Next, an electromagnetic wave detection apparatus 101 according to a second embodiment of the present disclosure will be described with reference to FIG. 14. In FIG. 14, elements having the same configurations as those of the first embodiment are denoted by the same reference signs.

As illustrated in FIG. 14, the electromagnetic wave detection apparatus 101 according to the present embodiment is different from the electromagnetic wave detection apparatus 100 illustrated in FIG. 4, in terms of including an infrared cut-off filter 125 for cutting infrared rays, in addition.

The infrared cut-off filter 125 serving as a fourth transmission unit is arranged in a rear stage of the wavelength separator 123. In particular, the infrared cut-off filter 125 is formed by vapor deposition on the third surface s3 of the prism 120. The infrared cut-off filter 125 has a transmittance of electromagnetic waves in a wavelength band other than the first wavelength band larger than a reflectance of the wavelength separator 123. Thus, the infrared cut-off filter 125 transmits electromagnetic waves reflected in the fourth direction d4 by the wavelength separator 123. Electromagnetic waves transmitted through the infrared cut-off filter 125 are detected by the second detector 140.

A visible light cut-off filter for cutting visible light, rather than the infrared cut-off filter 125, may be arranged on the third surface s3 of the prism 120. That is, the fourth transmission unit includes an infrared cut-off filter or a visible light cut-off filter.

Figure 15:
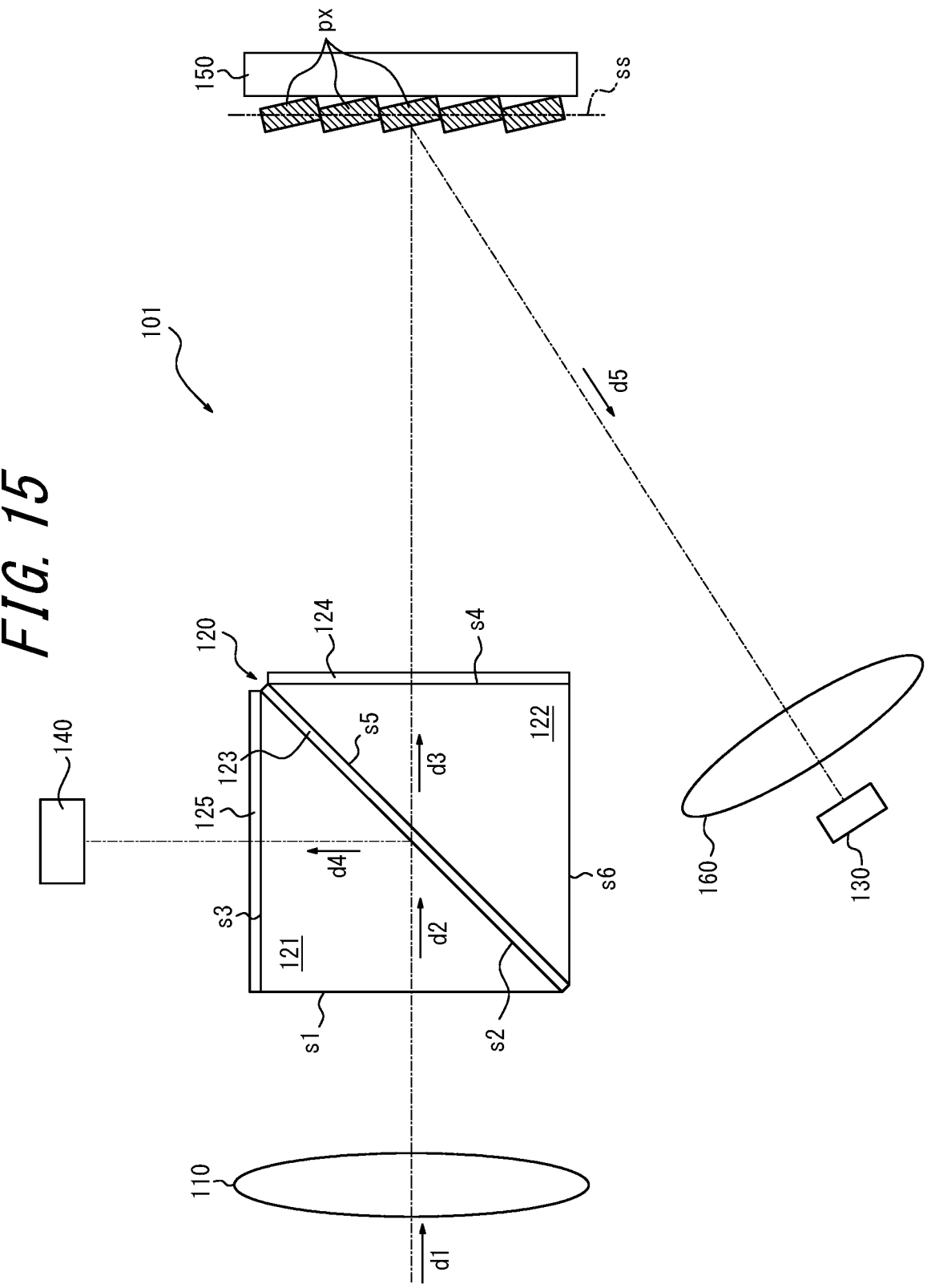
FIG. 15 is a diagram illustrating another example of the schematic configuration of the electromagnetic wave detection apparatus according to the second embodiment of the present disclosure.

The configuration of the electromagnetic wave detection apparatus 101 according to the present embodiment is not limited to the configuration illustrated in FIG. 14. As illustrated in FIG. 15, the electromagnetic wave detection apparatus 101 according to the present embodiment may have a configuration in which the infrared cut-off filter 125 is added to the electromagnetic wave detection apparatus 100 illustrated in FIG. 6.

Figure 16:
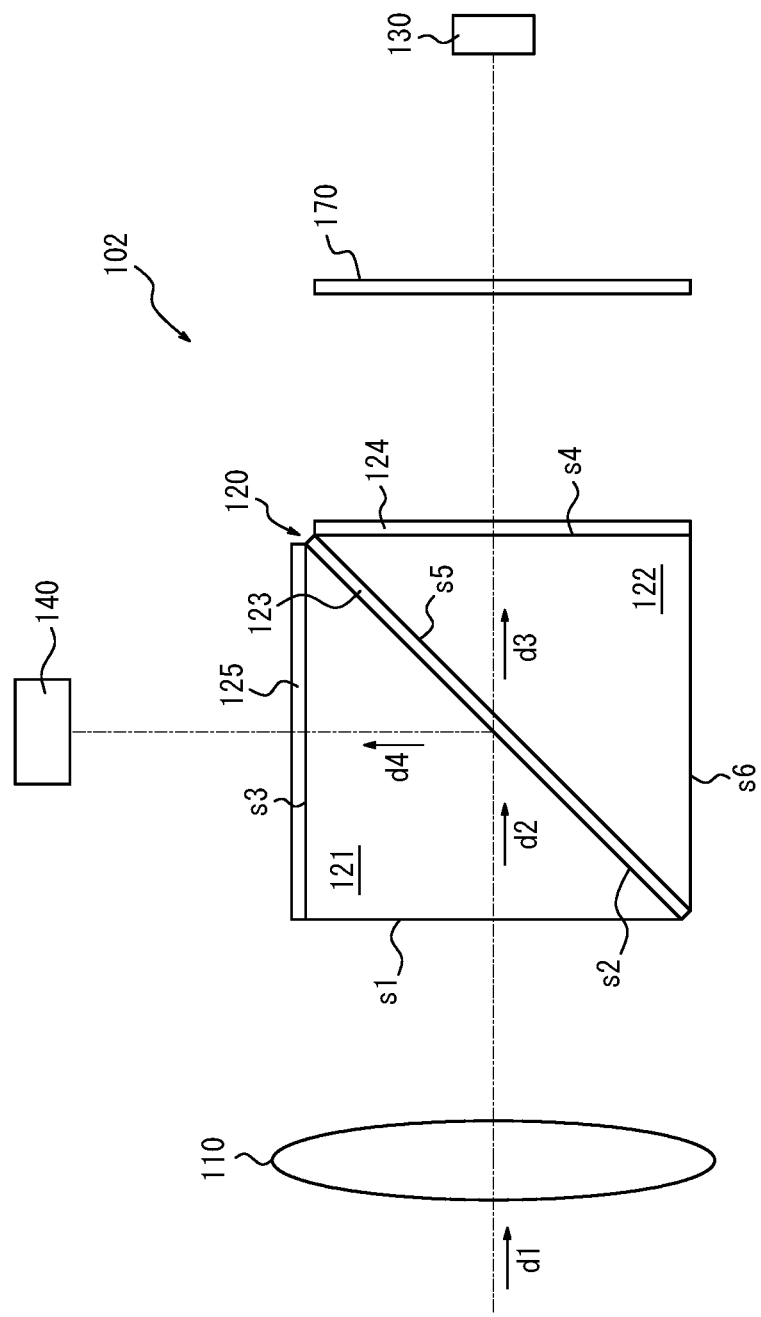
FIG. 16 is a diagram illustrating an example of a schematic configuration of an electromagnetic wave detection apparatus according to a third embodiment of the present disclosure.

Next, an electromagnetic wave detection apparatus 102 according to a third embodiment of the present disclosure will be described with reference to FIG. 16. In FIG. 16, elements having the same configurations as those of each of the embodiments described above are denoted by the same reference signs.

As illustrated in FIG. 16, the electromagnetic wave detection apparatus 102 according to the present embodiment is different from the electromagnetic wave detection apparatus 101 illustrated in FIG. 14, in terms of including a visible light cut-off filter 170 for cutting visible light, in addition.

The visible light cut-off filter 170 serving as a third transmission unit is arranged in a rear stage of the wavelength separator 123. In particular, the visible light cut-off filter 170 is arranged between the wavelength selector 124 and the first detector 130. The visible light cut-off filter 170 transmits electromagnetic waves transmitted through the wavelength separator 123 and the wavelength selector 124.

The visible light cut-off filter 170 has a transmittance of electromagnetic waves in a wavelength band other than the first wavelength band smaller than that of the wavelength separator 123, and a transmittance of electromagnetic waves in a wavelength band other than the second wavelength band smaller than that of the wavelength selector 124. Thus, the visible light cut-off filter 170 cuts off electromagnetic waves in a wavelength band other than the wavelength band in which the first wavelength band and the second wavelength band overlap with each other, from among electromagnetic waves transmitted through the wavelength separator 123 and the wavelength selector 124.

Alternatively, the visible light cut-off filter 170 has a transmittance of electromagnetic waves in a wavelength band other than the first wavelength band smaller than that of the wavelength separator 123, or a transmittance of electromagnetic waves in a wavelength band other than the second wavelength band smaller than that of the wavelength selector 124. Thus, the visible light cut-off filter 170 cuts off electromagnetic waves in one of the wavelength bands: wavelength bands on either side of the wavelength band in which the first wavelength band and the second wavelength band overlap with each other, from among electromagnetic waves transmitted through the wavelength separator 123 and the wavelength selector 124.

By including the visible light cut-off filter 170 as described above, the electromagnetic wave detection apparatus 102 according to the present embodiment can further suppress unnecessary light from being incident on the first detector 130 and improve the light receiving S/N ratio, whereby the first detector 130 can obtain a light receiving signal in good condition.

The infrared cut-off filter may be arranged in place of the visible light cut-off filter 170. That is, the third transmission unit includes the infrared cut-off filter or the visible light cut-off filter.

Figure 17:
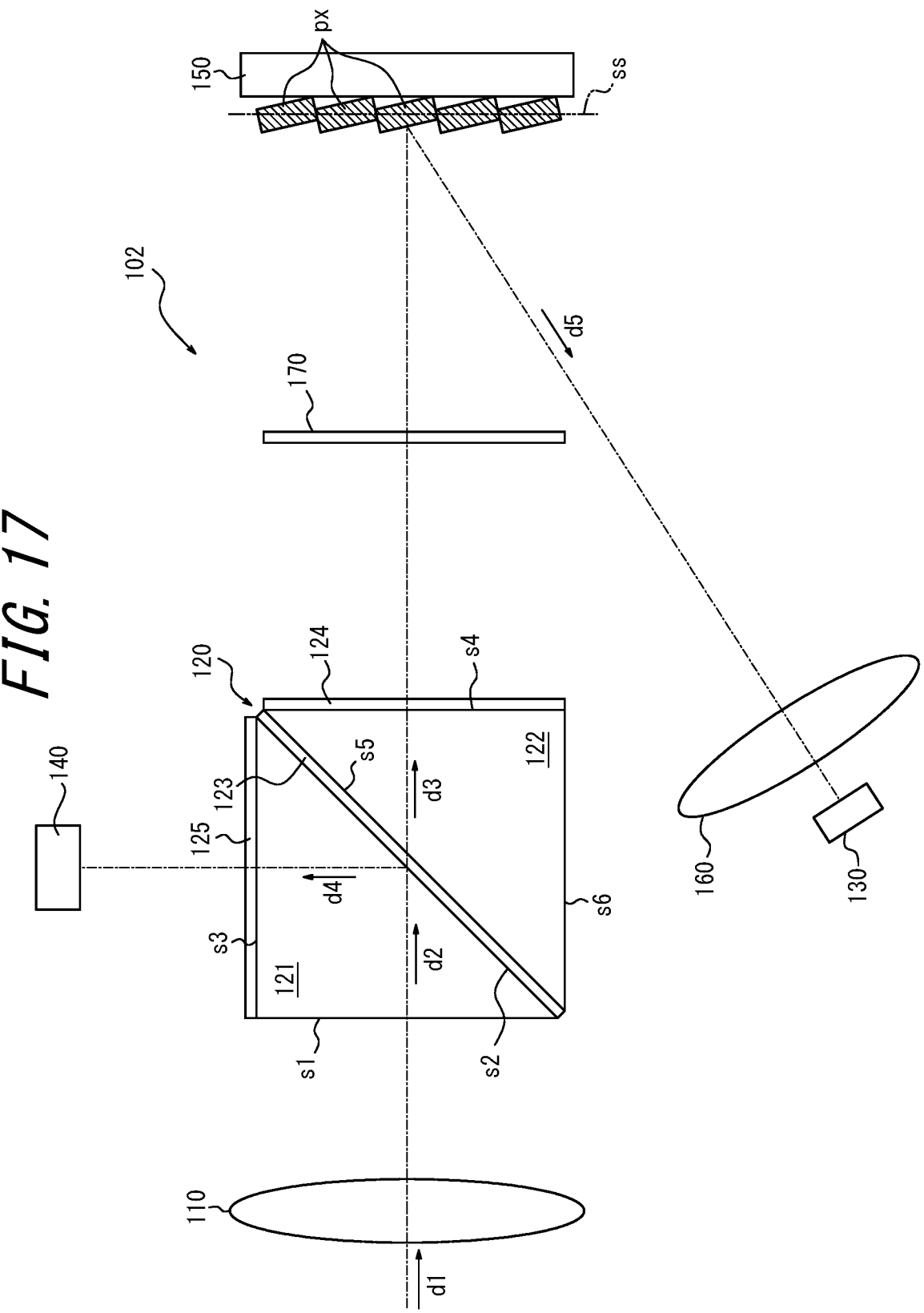
FIG. 17 is a diagram illustrating another example of the schematic configuration of the electromagnetic wave detection apparatus according to the third embodiment of the present disclosure.

The configuration of the electromagnetic wave detection apparatus 102 according to the present embodiment is not limited to the configuration illustrated in FIG. 16. As illustrated in FIG. 17, the electromagnetic wave detection apparatus 102 according to the present embodiment may have a configuration in which the visible light cut-off filter 170 is added to the electromagnetic wave detection apparatus 101 illustrated in FIG. 15.

Although FIG. 17 illustrates an example in which the visible light cut-off filter 170 is arranged between the wavelength selector 124 and the first progression unit 150, the arrangement of the visible light cut-off filter 170 is not limited thereto.

Figure 18:
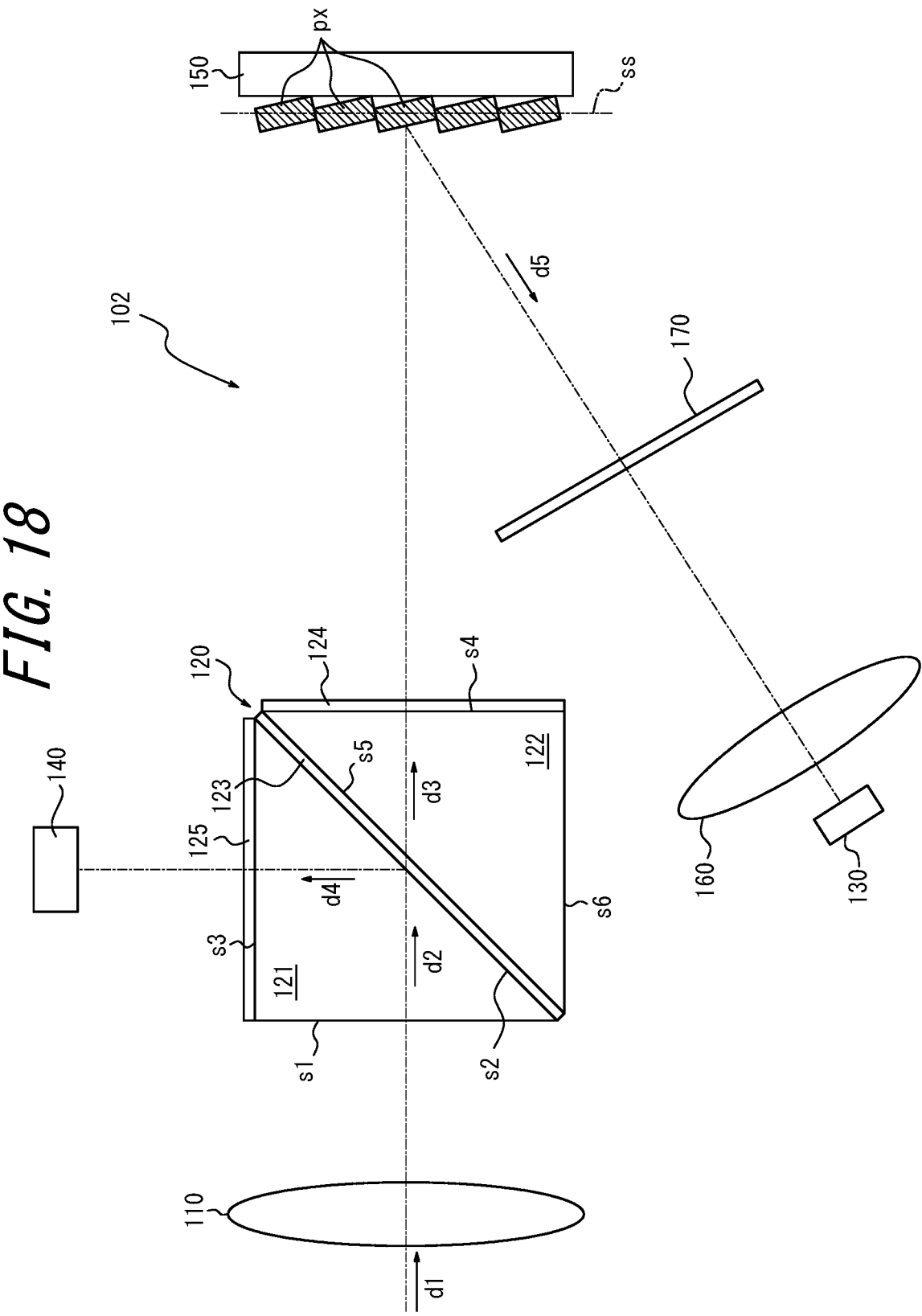
FIG. 18 is a diagram illustrating still another example of the schematic configuration of the electromagnetic wave detection apparatus according to the third embodiment of the present disclosure.
Figure 19:
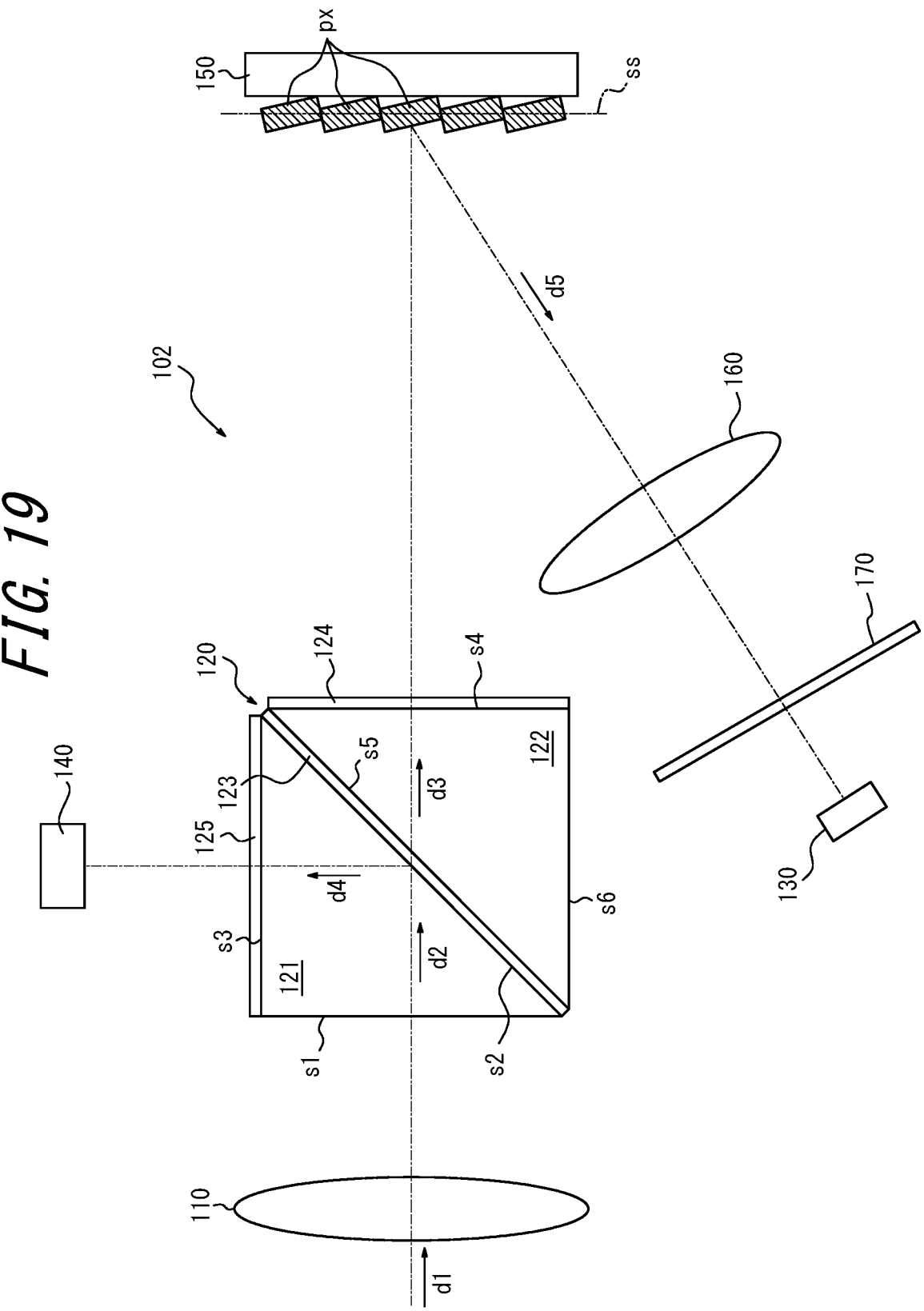
FIG. 19 is a diagram illustrating still another example of the schematic configuration of the electromagnetic wave detection apparatus according to the third embodiment of the present disclosure.

For example, the visible light cut-off filter 170 may be arranged between the first progression unit 150 and the second image forming unit 160, as illustrated in FIG. 18. Alternatively, the visible light cut-off filter 170 may be arranged between the second image forming unit 160 and the first detector 130, as illustrated in FIG. 19.

Figure 20:
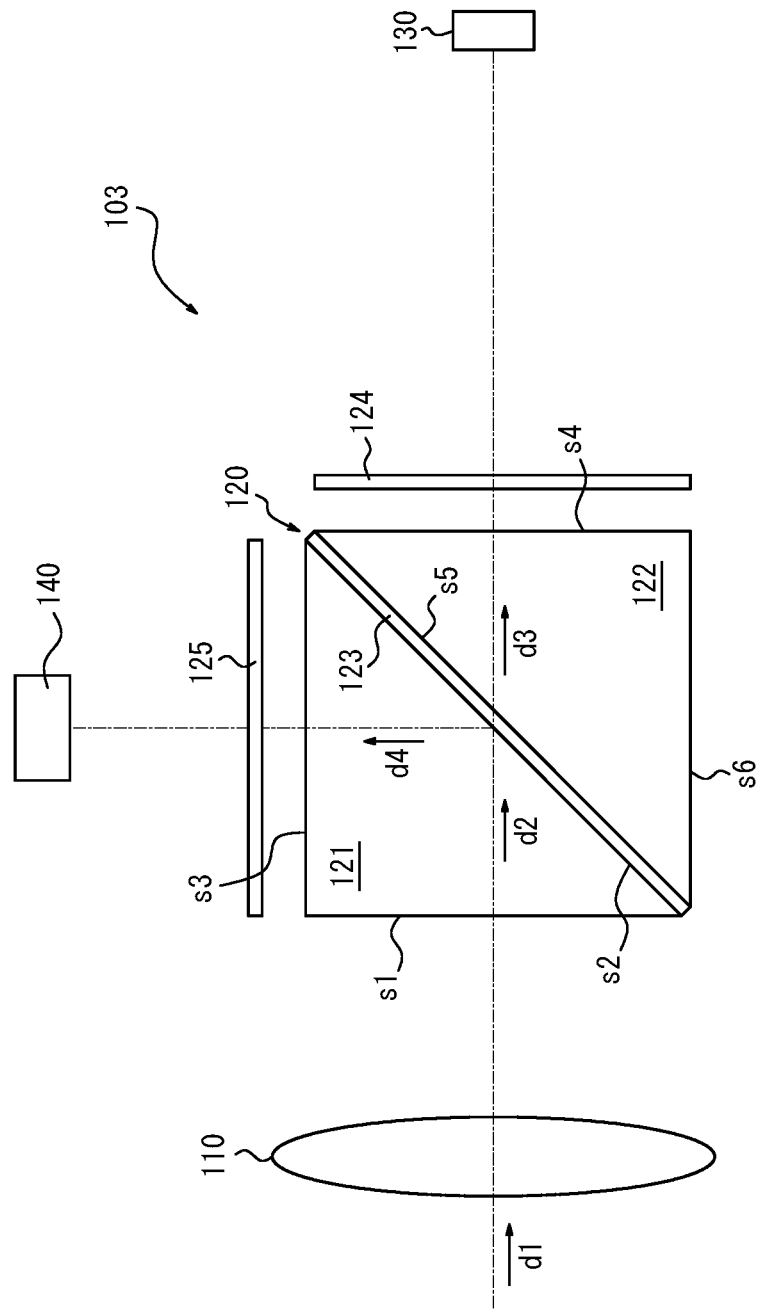
FIG. 20 is a diagram illustrating an example of a schematic configuration of an electromagnetic wave detection apparatus according to a fourth embodiment of the present disclosure.

Next, an electromagnetic wave detection apparatus 103 according to a fourth embodiment of the present disclosure will be described with reference to FIG. 20. In FIG. 20, elements having the same configurations as those of each of the embodiments described above are denoted by the same reference signs.

As illustrated in FIG. 20, the electromagnetic wave detection apparatus 103 according to the present embodiment has a different arrangement of the wavelength selector 124 and the infrared cut-off filter 125 from the arrangement of them in the electromagnetic wave detection apparatus 101 illustrated in FIG. 14. In the present embodiment, the wavelength selector 124 and the infrared cut-off filter 125 are not deposited on the prism 120 but are separated from the prism 120 and arranged independently, as illustrated in FIG. 20.

Figure 21:
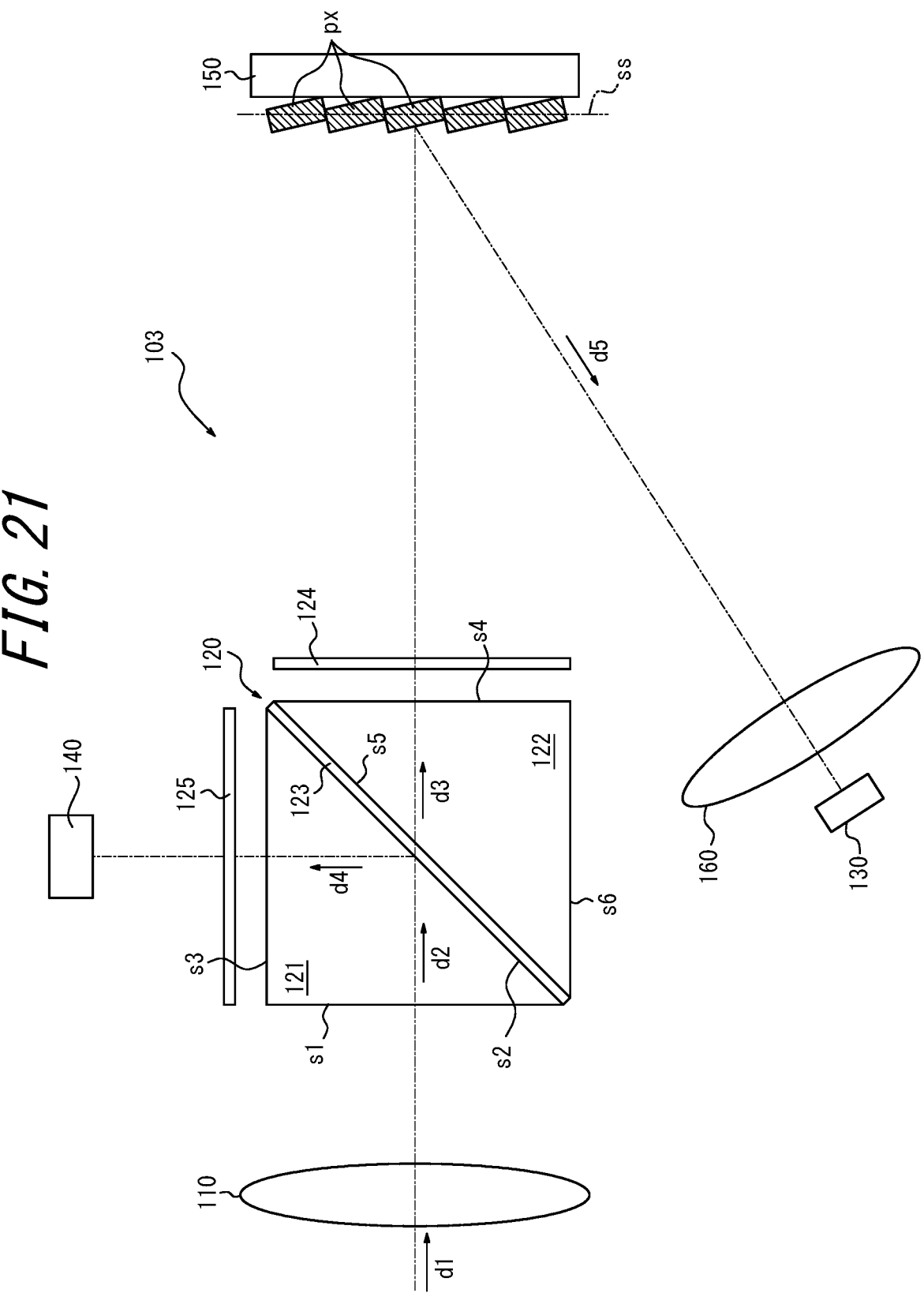
FIG. 21 is a diagram illustrating another example of the schematic configuration of the electromagnetic wave detection apparatus according to the fourth embodiment of the present disclosure.
Figure 22:
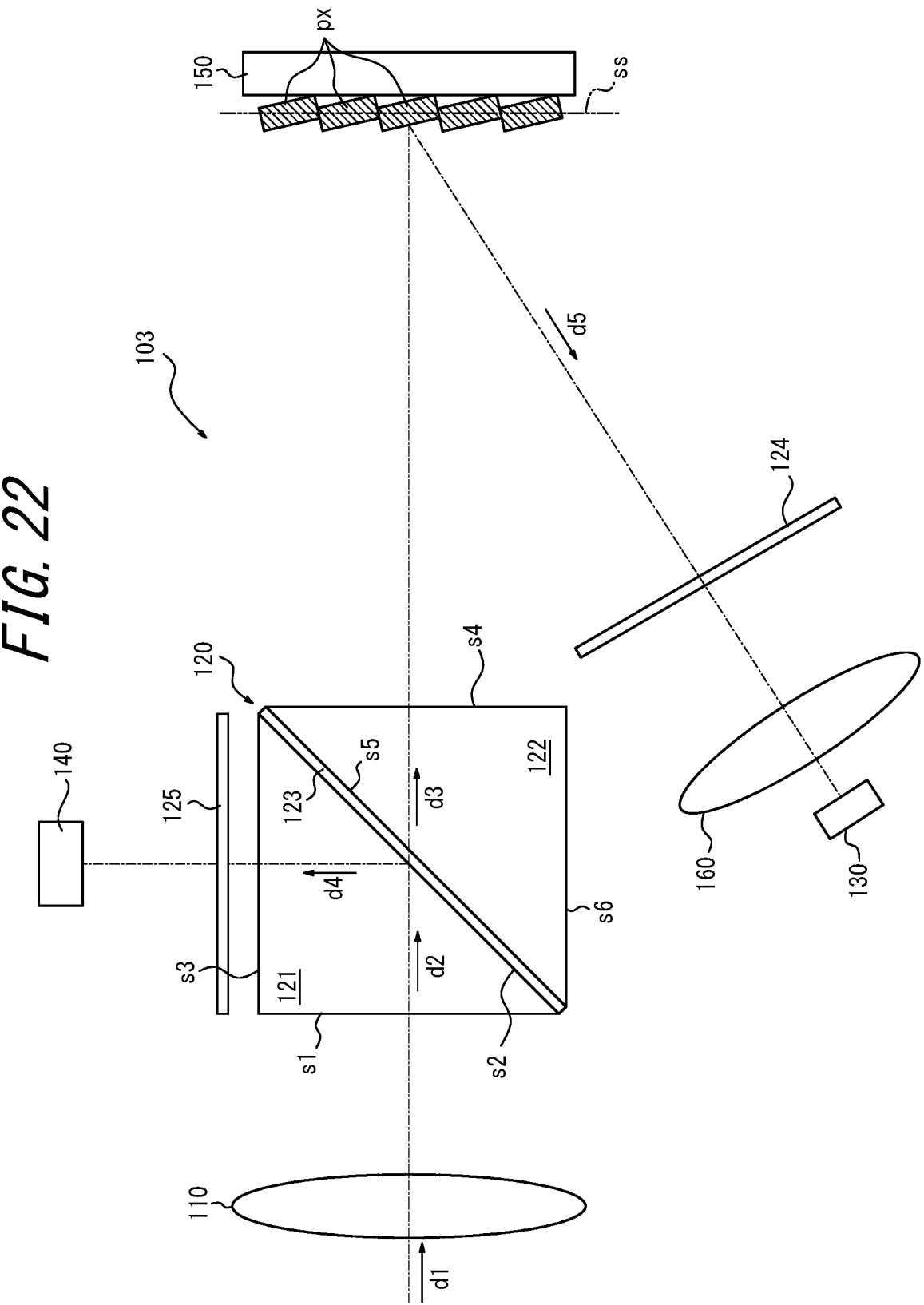
FIG. 22 is a diagram illustrating still another example of the schematic configuration of the electromagnetic wave detection apparatus according to the fourth embodiment of the present disclosure.
Figure 23:
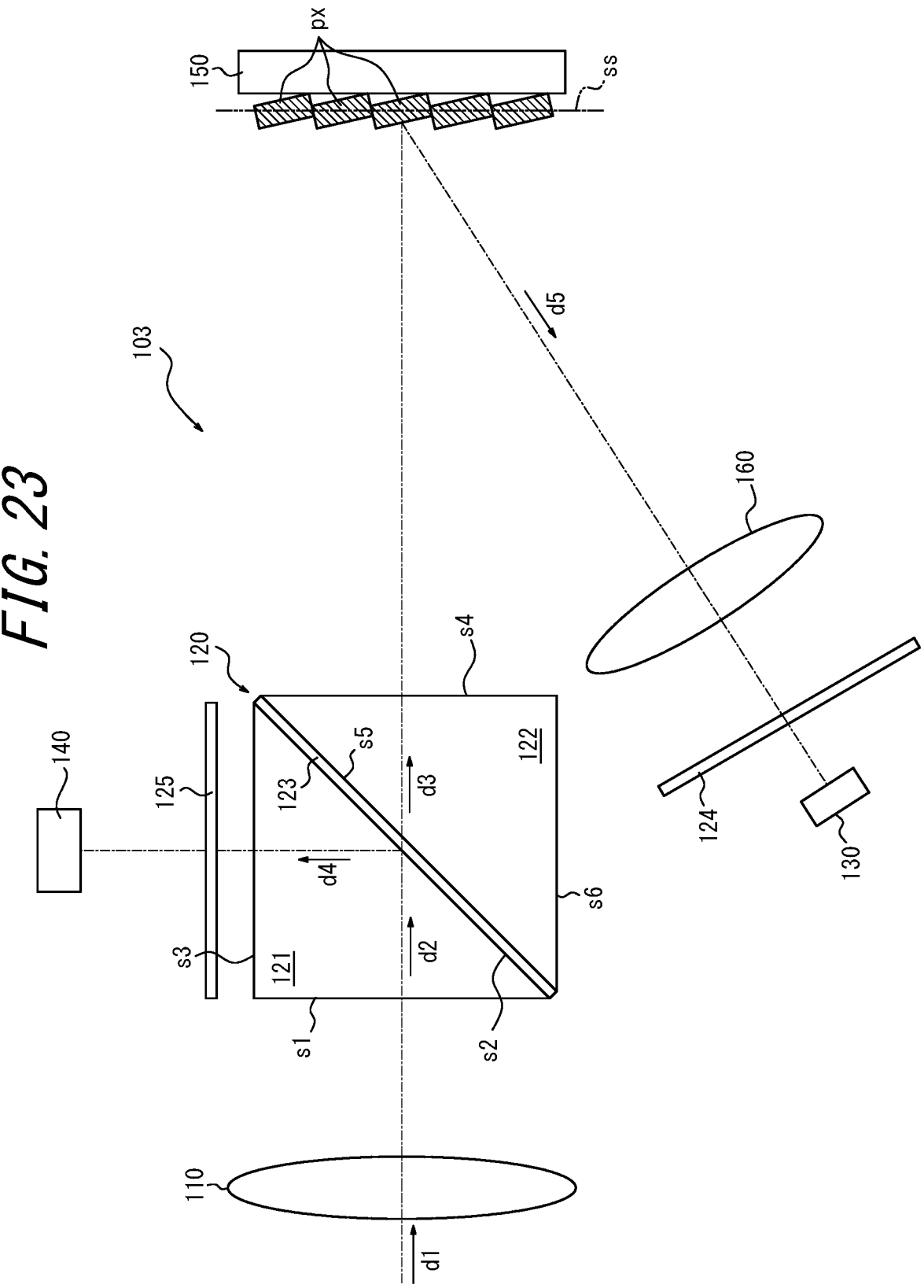
FIG. 23 is a diagram illustrating still another example of the schematic configuration of the electromagnetic wave detection apparatus according to the fourth embodiment of the present disclosure.

The configuration of the electromagnetic wave detection apparatus 103 according to the present embodiment is not limited to the configuration illustrated in FIG. 20. As illustrated in FIG. 21, for example, the electromagnetic wave detection apparatus 103 according to the present embodiment may have a configuration in which the wavelength selector 124 and the infrared cut-off filter 125 are separated from the prism 120 and arranged independently in the electromagnetic wave detection apparatus 101 illustrated in FIG. 15. The electromagnetic wave detection apparatus 103 according to the present embodiment may have a configuration in which the wavelength selector 124 is arranged between the first progression unit 150 and the second image forming unit 160, as illustrated in FIG. 22. Alternatively, the electromagnetic wave detection apparatus 103 according to the present embodiment may have a configuration in which the wavelength selector 124 is arranged between the second image forming unit 160 and the first detector 130, as illustrated in FIG. 23.

Although the present embodiment has been described using an example in which the wavelength selector 124 and the infrared cut-off filter 125 are separated from the prism 120 and independently arranged, this is not restrictive. One of the wavelength selector 124 and the infrared cut-off filter 125 may be separated from the prism 120 and independently arranged.

Figure 24:
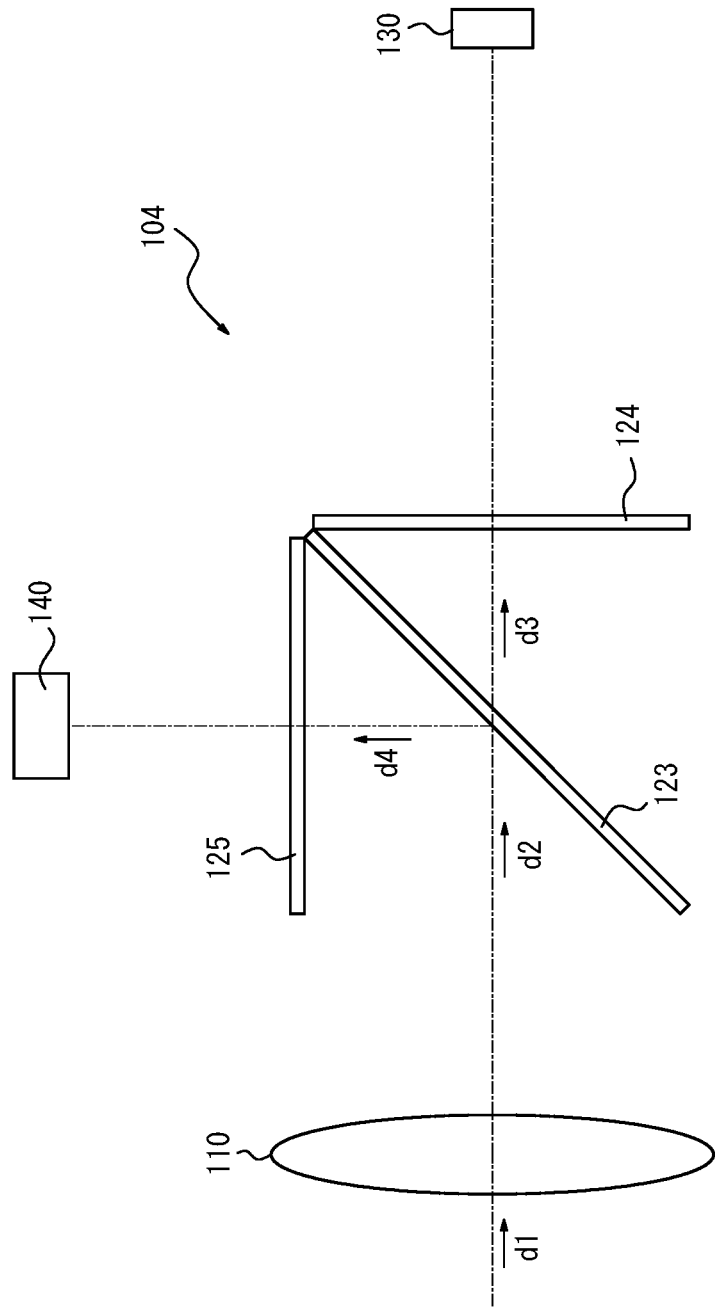
FIG. 24 is a diagram illustrating an example of a schematic configuration of an electromagnetic wave detection apparatus according to a fifth embodiment of the present disclosure.

Next, an electromagnetic wave detection apparatus 104 according to a fifth embodiment of the present disclosure will be described with reference to FIG. 24. In FIG. 24, elements having the same configurations as those of each of the embodiments described above are denoted by the same reference signs.

As illustrated in FIG. 24, the electromagnetic wave detection apparatus 104 according to the present embodiment is different from the electromagnetic wave detection apparatus 101 illustrated in FIG. 14, in terms of omitting the prism 120 (the first prism 121 and the second prism 122). In the present embodiment, that is, the wavelength separator 123, the wavelength selector 124, and the infrared cut-off filter 125 are not deposited on the prism 120 but are arranged independently. In this case, each of the wavelength separator 123, the wavelength selector 124, and the infrared cut-off filter 125 is configured as, for example, an element including a plate-like shape.

In a case in which the wavelength separator 123, the wavelength selector 124, and the infrared cut-off filter 125 are formed by vapor deposition on the prism 120 as those in the electromagnetic wave detection apparatus 101 illustrated in FIG. 14, an alignment of them is facilitated and the positioning accuracy is improved. On the other hand, in a case in which the wavelength separator 123, the wavelength selector 124, and the infrared cut-off filter 125 are arranged independently as those in the electromagnetic wave detection apparatus 104 according to the present embodiment, the prism 120 can be omitted, whereby a reduction in weight and the number of components can be realized. Further, because the prism 120 is not used, the electromagnetic wave detection apparatus 104 according to the present embodiment can suppress occurrence of flares or ghosts caused by unnecessary reflection or the like in the prism 120.

Figure 25:
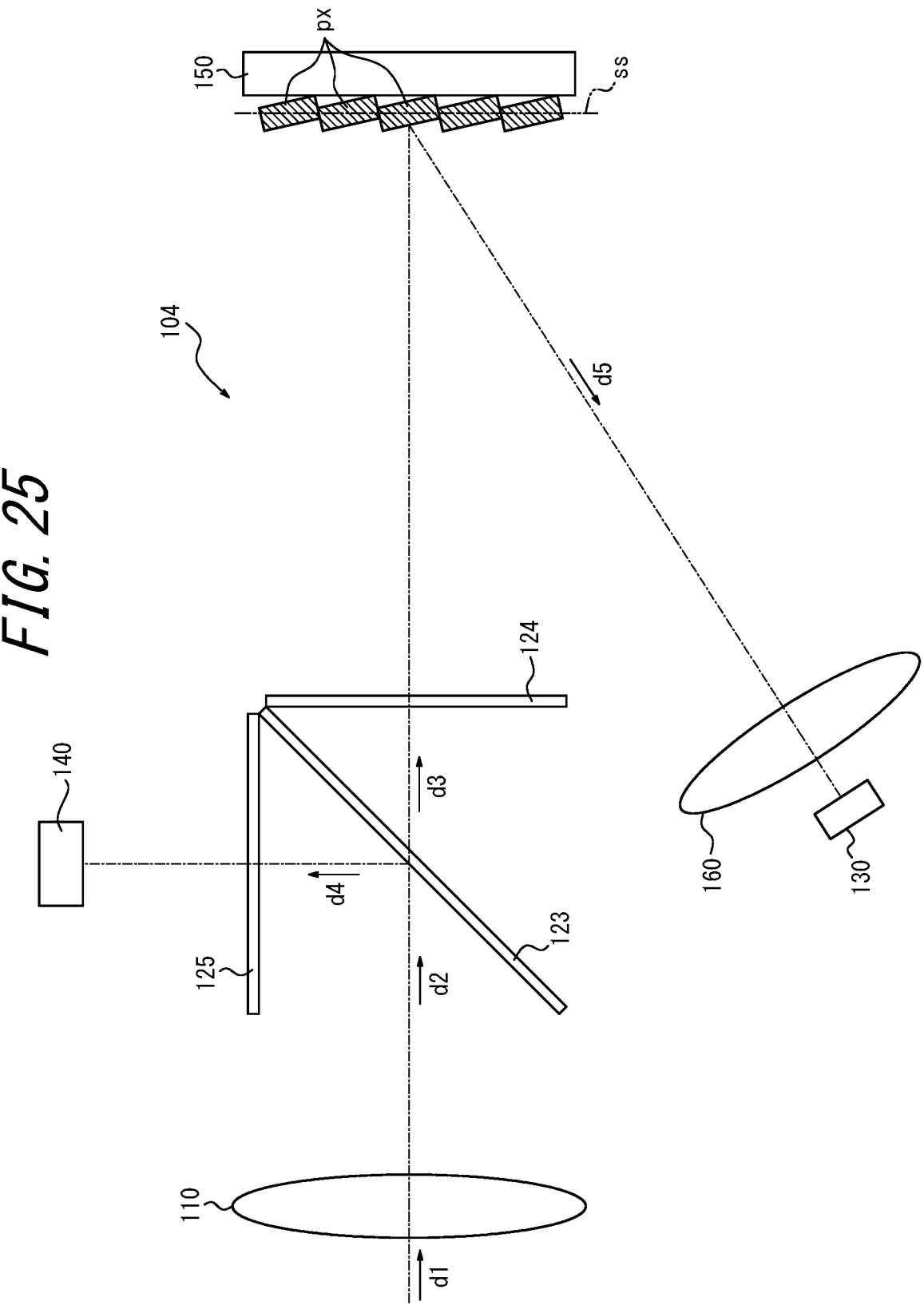
FIG. 25 is a diagram illustrating another example of the schematic configuration of the electromagnetic wave detection apparatus according to the fifth embodiment of the present disclosure.
Figure 26:
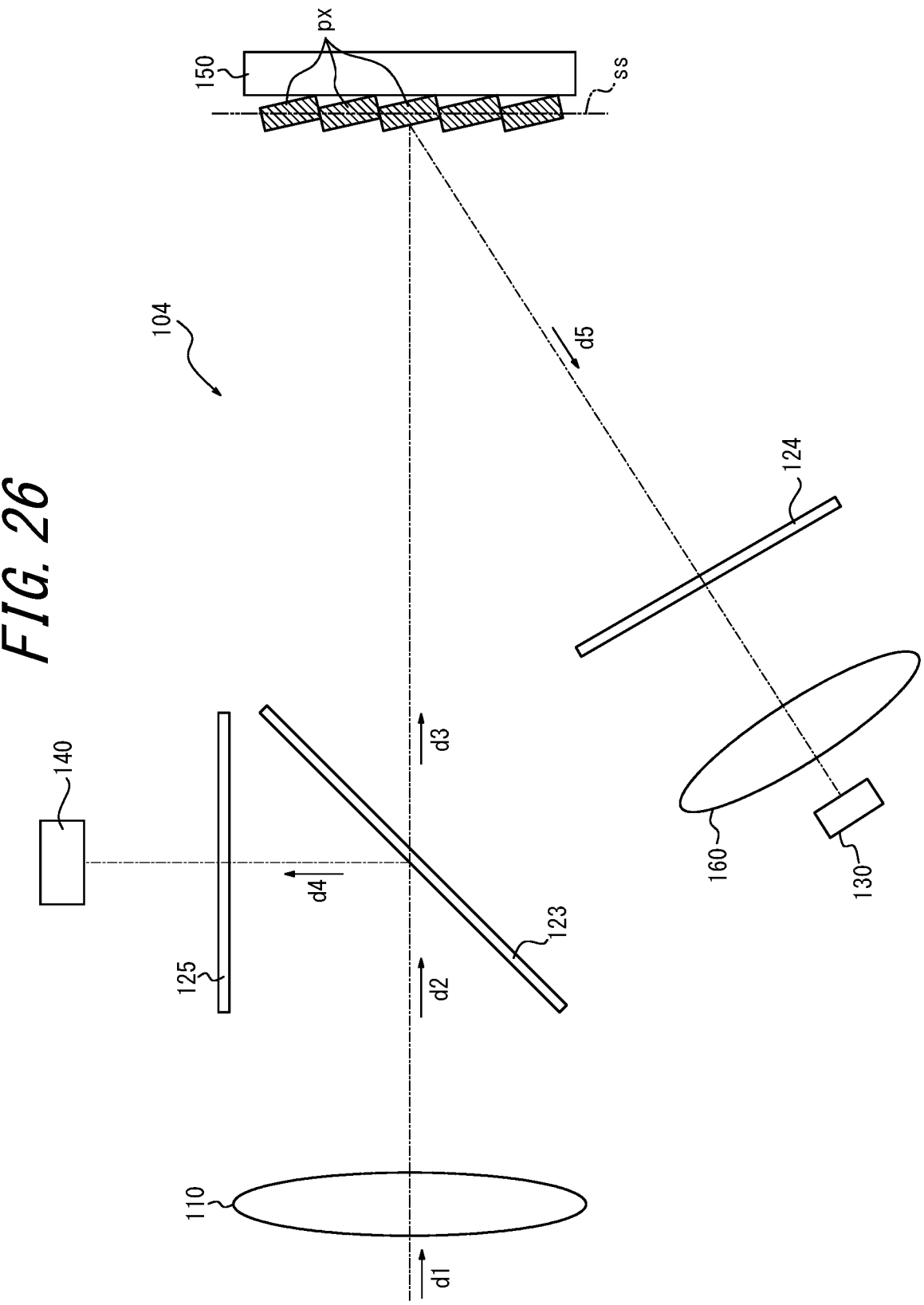
FIG. 26 is a diagram illustrating still another example of the schematic configuration of the electromagnetic wave detection apparatus according to the fifth embodiment of the present disclosure.

The configuration of the electromagnetic wave detection apparatus 104 according to the present embodiment is not limited to the configuration illustrated in FIG. 24. For example, the electromagnetic wave detection apparatus 104 according to the present embodiment may have a configuration as illustrated in FIG. 25, in which the prism 120 is omitted from the electromagnetic wave detection apparatus 101 illustrated in FIG. 15. The electromagnetic wave detection apparatus 104 according to the present embodiment may have a configuration in which the wavelength selector 124 is arranged between the first progression unit 150 and the second image forming unit 160, as illustrated in FIG. 26.

Figure 27:
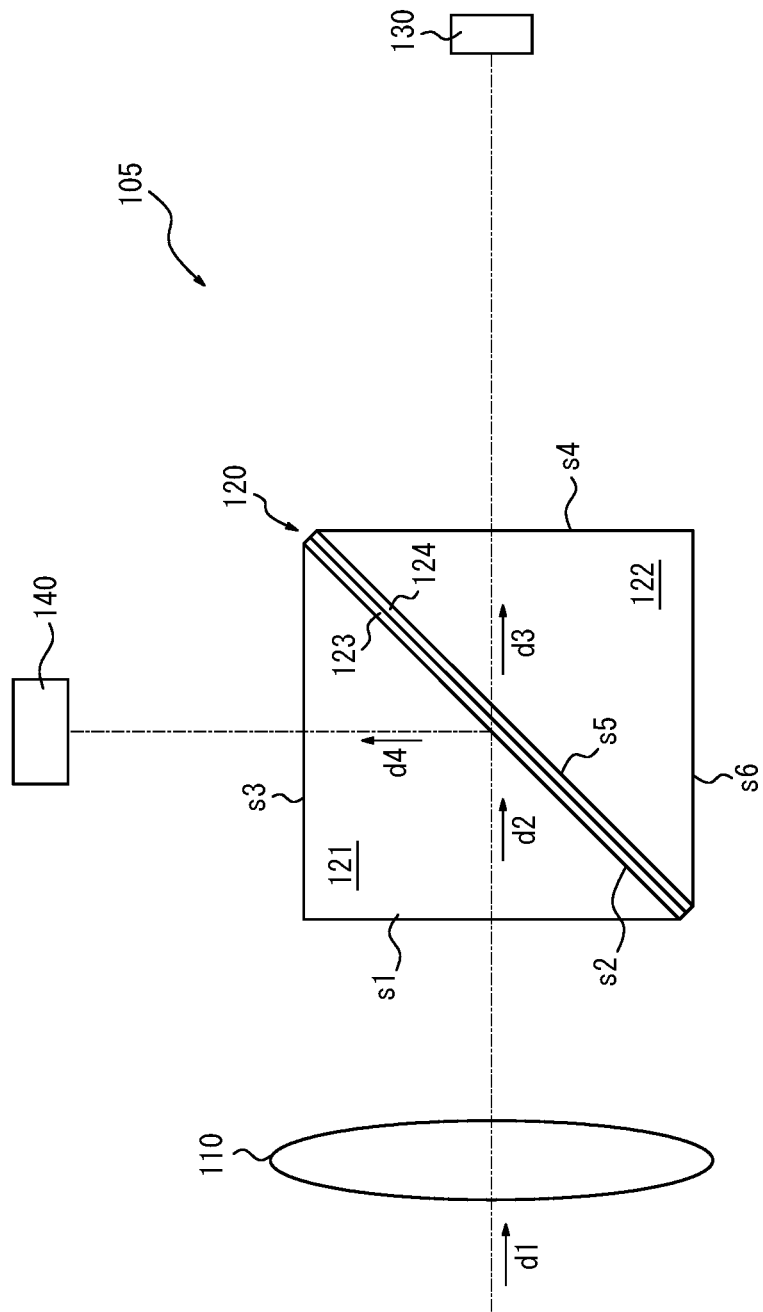
FIG. 27 is a diagram illustrating an example of a schematic configuration of an electromagnetic wave detection apparatus according to a sixth embodiment of the present disclosure.

Next, an electromagnetic wave detection apparatus 105 according to a sixth embodiment of the present disclosure will be described with reference to FIG. 27. In FIG. 27, elements having the same configurations as those of the embodiments described above are denoted by the same reference signs.

As illustrated in FIG. 27, the electromagnetic wave detection apparatus 105 according to the present embodiment is different from the electromagnetic wave detection apparatus 100 illustrated in FIG. 4, in terms of the arrangement of the wavelength selector 124. In the present embodiment, the wavelength selector 124 is arranged between the wavelength separator 123 and the second prism 122, as illustrated in FIG. 27. The wavelength selector 124 is, for example, vapor-deposited on the fifth surface s5 of the second prism 122 or the surface opposite from the second surface s2 of the first prism 121 of the wavelength separator 123.

Figure 28:
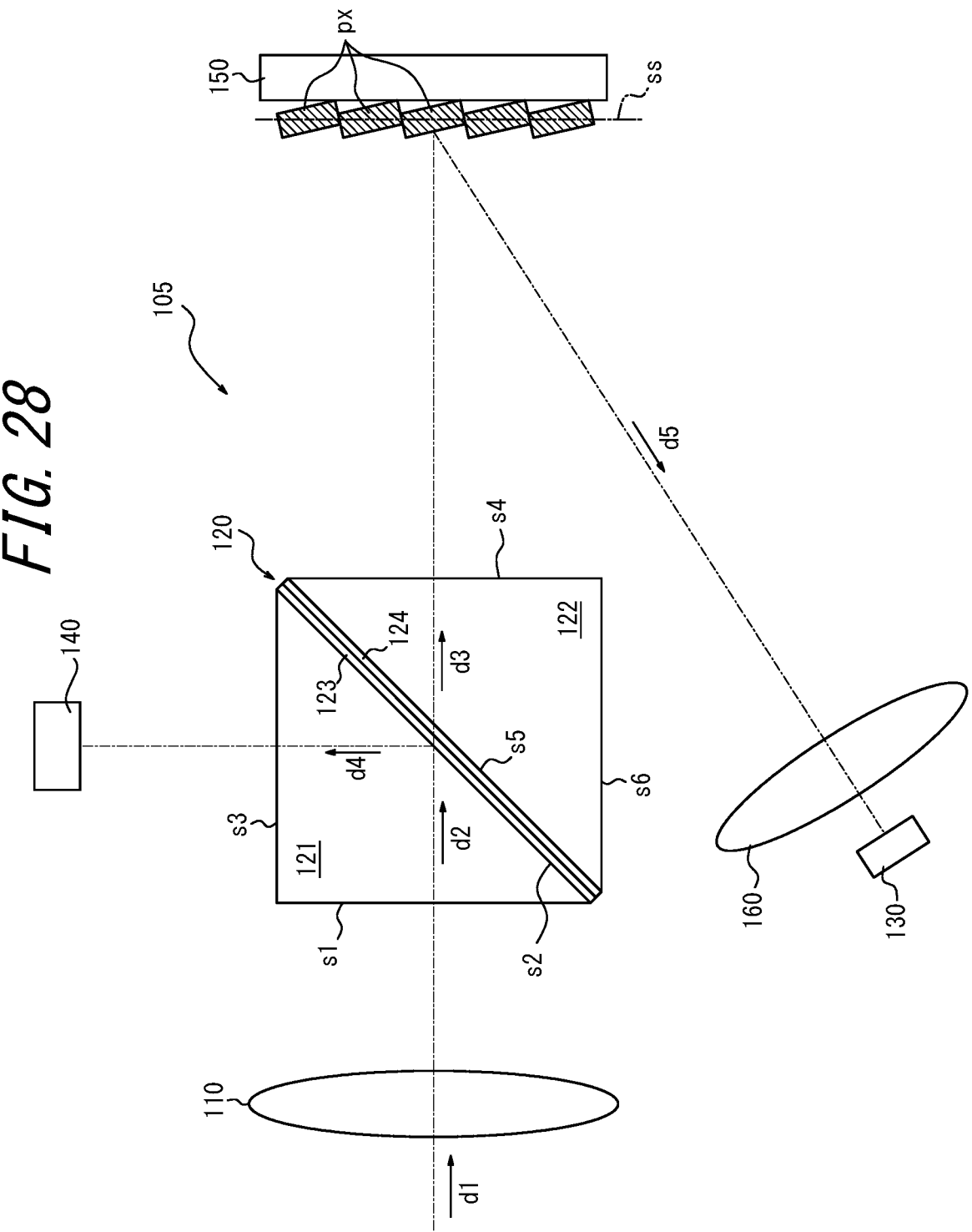
FIG. 28 is a diagram illustrating another example of the schematic configuration of the electromagnetic wave detection apparatus according to the sixth embodiment of the present disclosure.

The configuration of the electromagnetic wave detection apparatus 105 according to the present embodiment is not limited to the configuration illustrated in FIG. 27. For example, the electromagnetic wave detection apparatus 105 according to the present embodiment may have a configuration as illustrated in FIG. 28, in which the wavelength selector 124 is arranged between the wavelength separator 123 and the second prism 122 in the electromagnetic wave detection apparatus 100 illustrated in FIG. 6.

Figure 29:
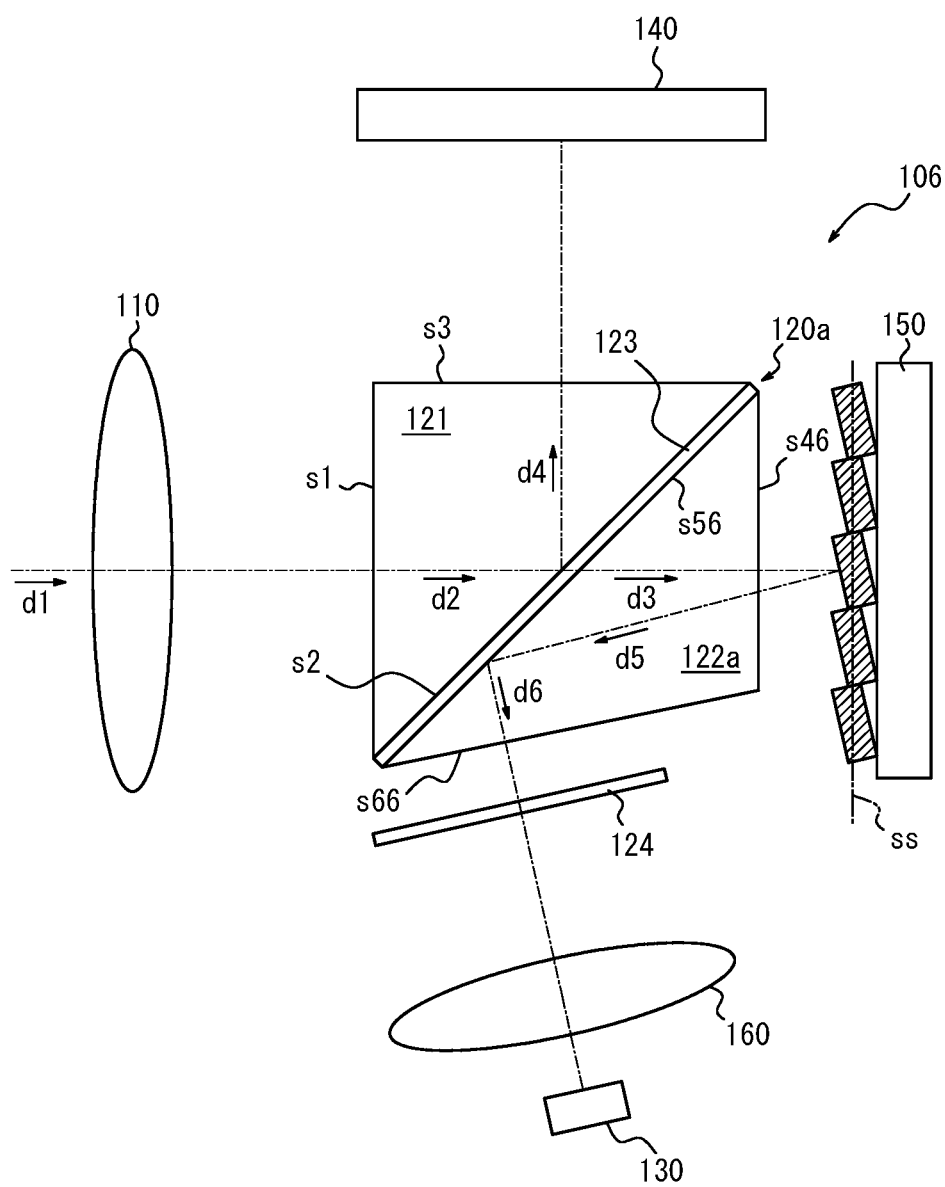
FIG. 29 is a diagram illustrating an example of a schematic configuration of an electromagnetic wave detection apparatus according to a seventh embodiment of the present disclosure.

Next, an electromagnetic wave detection apparatus 106 according to a seventh embodiment of the present disclosure will be described with reference to FIG. 29. In FIG. 29, elements having the same configurations as those of each of the embodiments described above are denoted by the same reference signs.

The electromagnetic wave detection apparatus 106 according to the present embodiment is different from the electromagnetic wave detection apparatus 100 illustrated in FIG. 6, in terms of including a prism 122a rather than the prism 120 and having a different arrangement of the wavelength selector 124.

The prism 120a is different from the prism 120, in terms of including the second prism 122a rather than the second prism 122.

The second prism 122a may contain a fourth surface s46, a fifth surface s56, and a sixth surface s66 as different surfaces. The second prism 122a includes, for example, a triangular prism. The fourth surface s46, the fifth surface s56, and the sixth surface s66 may intersect with one another.

The fourth surface s46 emits electromagnetic waves progressing in the third direction d3 to the reference surface ss of the first progression unit 150. Also, the fourth surface s46 causes electromagnetic waves re-incident from the reference surface ss of the first progression unit 150 to progress in the fifth direction d5. That is, the electromagnetic wave detection apparatus 106 according to the present embodiment includes the fourth surface s46 serving as a first emission surface that emits electromagnetic waves progressing via the wavelength separator 123 to the reference surface ss of the first progression unit 150 and receives re-incident electromagnetic waves progressing in the particular direction from the reference surface ss. The fourth surface s46 may be perpendicular to a progression axis of electromagnetic waves progressing in the third direction d3, that is, perpendicular to the third direction d3. The fourth surface s46 may be parallel to the reference surface ss of the first progression unit 150. The fourth surface s46 may transmit or refract electromagnetic waves re-incident from the reference surface ss and cause the electromagnetic waves to progress in the fifth direction d5.

The fifth surface s56 causes electromagnetic waves progressing in the fifth direction d5 to progress in the sixth direction d6. The fifth surface s56 may internally reflect electromagnetic waves progressing in the fifth direction d5 and cause the electromagnetic waves to progress in the sixth direction d6. The fifth surface s56 may totally internally reflect electromagnetic waves progressing in the fifth direction d5 and cause the electromagnetic waves to progress in the sixth direction d6. An incident angle of electromagnetic waves progressing in the fifth direction d5 with respect to the fifth surface s56 may be equal to or greater than a critical angle. The incident angle of the electromagnetic waves progressing in the fifth direction d5 with respect to the fifth surface s56 may be different from an incident angle of electromagnetic waves progressing in the second direction d2 with respect to the second surface s2. The incident angle of the electromagnetic waves progressing in the fifth direction d5 with respect to the fifth surface s56 may be larger than the incident angle of the electromagnetic waves progressing in the second direction d2 with respect to the second surface s2.

The sixth surface s66 emits electromagnetic waves progressing in the sixth direction d6. That is, the electromagnetic wave detection apparatus 106 according to the present embodiment includes the sixth surface s66 serving as a second emission surface that emits electromagnetic waves re-incident from the fourth surface s46. The sixth surface s66 may be perpendicular to a progression axis of the electromagnetic waves progressing in the sixth direction d6, that is, perpendicular to the sixth direction d6. Electromagnetic waves emitted from the sixth surface s66 are detected by the first detector 130.

The second prism 122a may be arranged such that the fifth surface s56 is parallel to and opposes the second surface s2 of the first prism 121. The second prism 122a may be arranged such that the fourth surface s46 is arranged in a progression direction of electromagnetic waves progressing within the second prism 122a via the fifth surface s56 after being transmitted through the second surface s2 of the first prism 121.

Figure 30:
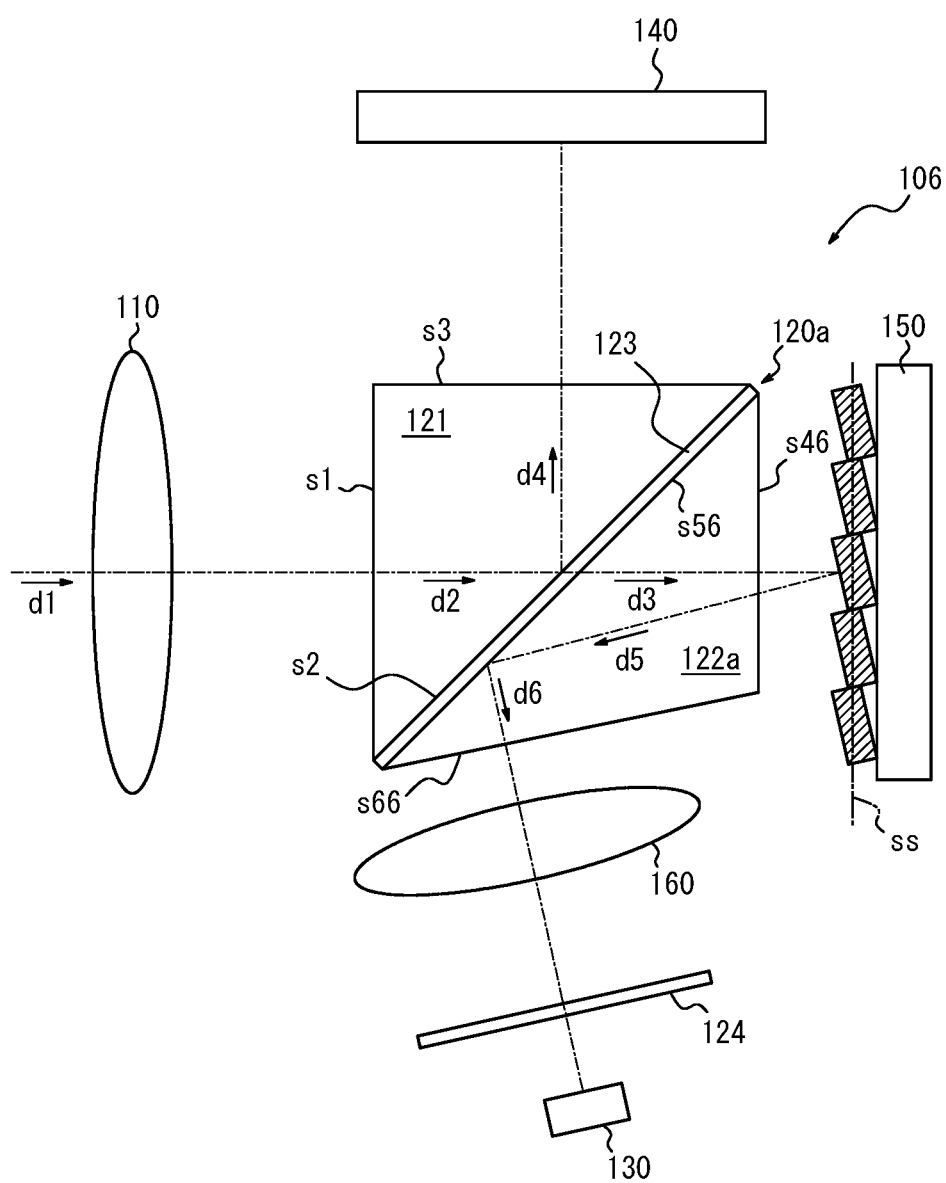
FIG. 30 is a diagram illustrating another example of the schematic configuration of the electromagnetic wave detection apparatus according to the seventh embodiment of the present disclosure.
Figure 31:
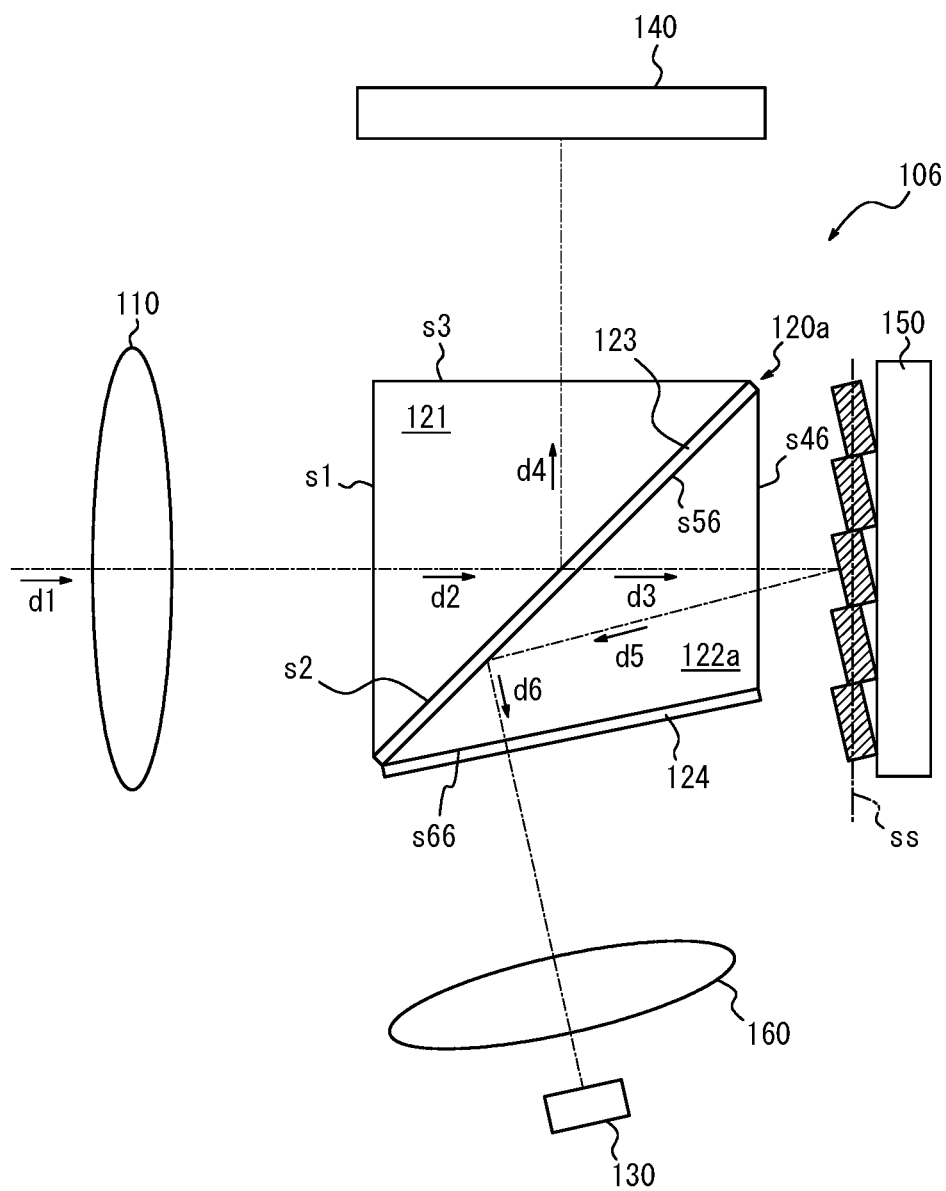
FIG. 31 is a diagram illustrating still another example of the schematic configuration of the electromagnetic wave detection apparatus according to the seventh embodiment of the present disclosure.

The wavelength selector 124 may be arranged between the sixth surface s66 of the prism 120a and the first detector 130. For example, the wavelength selector 124 may be arranged as a single element between the sixth surface s66 of the prism 120a and the second image forming unit 160, as illustrated in FIG. 29. The wavelength selector 124 may be arranged as a single element between the second image forming unit 160 and the first detector 130, as illustrated in FIG. 30. The wavelength selector 124 may be formed by vapor deposition on the sixth surface s66 of the prism 120a, as illustrated in FIG. 31.

Further, the wavelength selector 124 may be arranged between the fourth surface s46 of the prism 120a and the first progression unit 150. For example, the wavelength selector 124 may be formed by vapor deposition on the fourth surface s46 of the prism 120a, as illustrated in FIG. 32.

Figure 32:
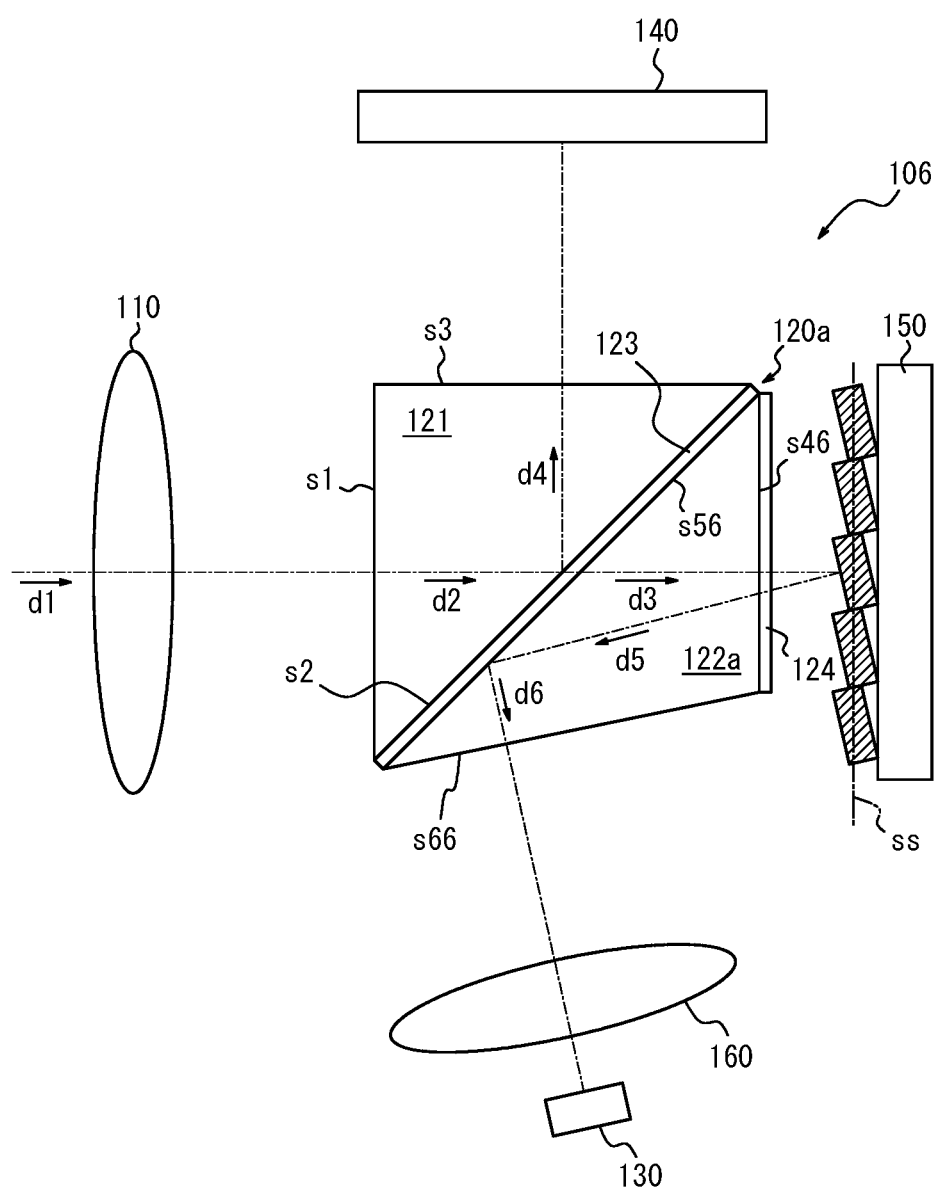
FIG. 32 is a diagram illustrating still another example of the schematic configuration of the electromagnetic wave detection apparatus according to the seventh embodiment of the present disclosure.

In a case in which the wavelength selector 124 is arranged between the fourth surface s46 of the prism 120a and the first progression unit 150 as illustrated in FIG. 32, electromagnetic waves having twice passed through the wavelength selector 124 are incident on the first detector 130. In this case, because the electromagnetic waves pass through the wavelength selector 124 twice, an amount of electromagnetic waves incident on the first detector 130 may be reduced. On the other hand, in a case in which the wavelength selector 124 is arranged between the sixth surface s66 of the prism 120a and the first detector 130 as illustrated in FIG. 29 to FIG. 31, electromagnetic waves having once passed through the wavelength selector 124 are incident on first detector 130. This configuration can suppress a reduction in the amount of electromagnetic waves incident on the first detector 130.

Figure 33:
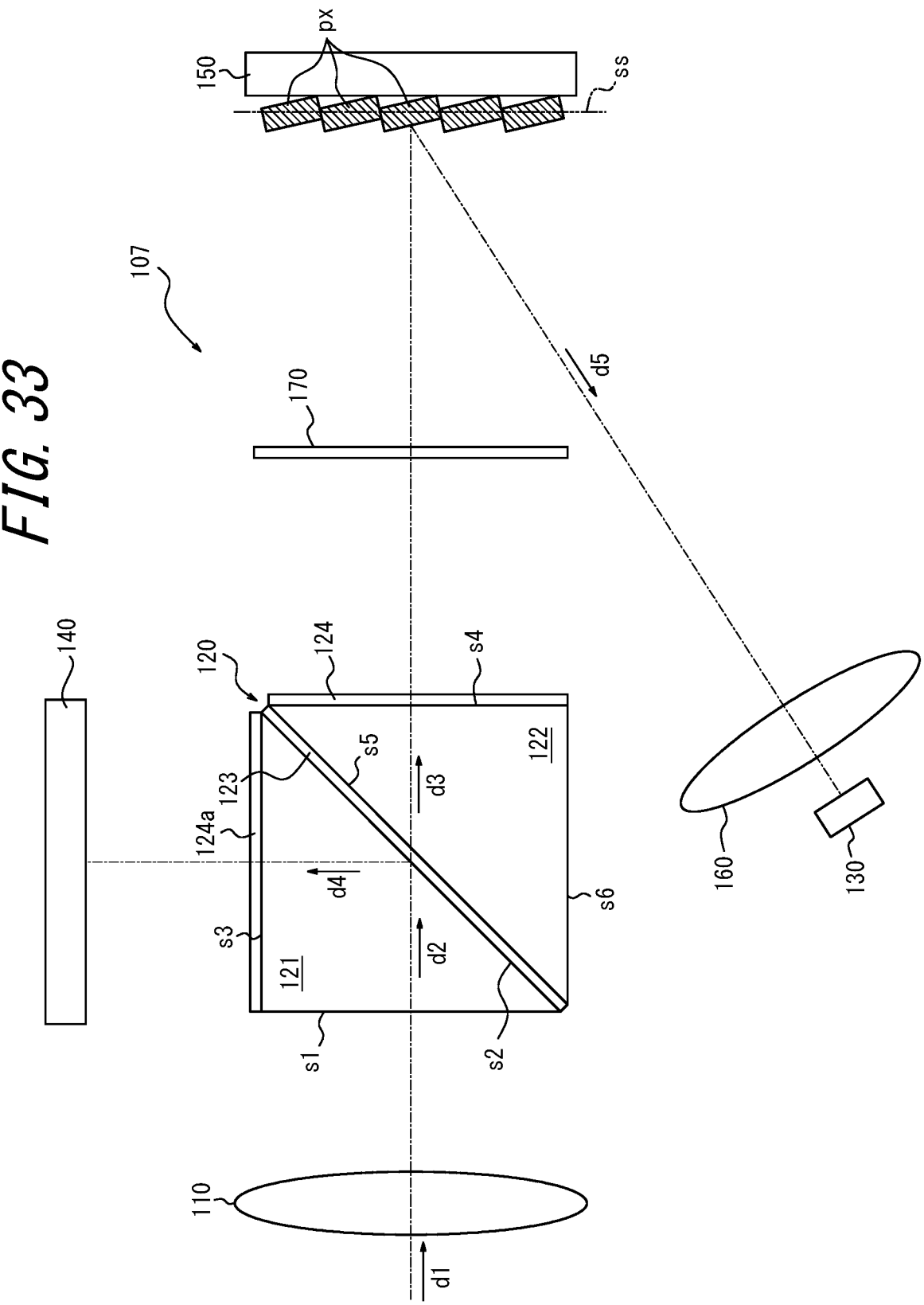
FIG. 33 is a diagram illustrating an example of a schematic configuration of an electromagnetic wave detection apparatus according to an eighth embodiment of the present disclosure.

Next, an electromagnetic wave detection apparatus 107 according to an eighth embodiment of the present disclosure will be described with reference to FIG. 33. In FIG. 33, elements having the same configurations as those of each of the embodiments described above are denoted by the same reference signs.

The electromagnetic wave detection apparatus 107 according to the present embodiment is different from the electromagnetic wave detection apparatus 100 illustrated in FIG. 6, in terms of including a wavelength selector 124a and the visible light cut-off filter 170, in addition. The configuration and function of the visible light cut-off filter 170 are the same as those of the third embodiment.

The wavelength selector 124a serving as a fifth transmission unit is arranged on the third surface s3 of the first prism 121. The wavelength selector 124a is formed from a single-layer or multi-layer thin film deposited on the third surface s3. The wavelength selector 124a transmits electromagnetic waves in a third wavelength band. That is, the wavelength selector 124a has a transmittance of electromagnetic waves in the third wavelength band larger than a transmittance of electromagnetic wave in a wavelength band other than the third wavelength band. Here, the wavelength band of electromagnetic waves reflected by the wavelength separator 123 and the third wavelength band partially overlap with each other. The wavelength selector 124a includes any of a long pass filter, a short pass filter, and a bandpass filter.

The second detector 140 detects electromagnetic waves transmitted through the wavelength selector 124a after being reflected by the wavelength separator 123. Here, a wavelength band of electromagnetic waves detected by the second detector 140, a wavelength band of the electromagnetic waves reflected by the wavelength separator 123, and the third wavelength band at least partially overlap with one another. The wavelength band of electromagnetic waves detected by the second detector 140 may include the entire wavelength band in which the wavelength band of electromagnetic waves reflected by the wavelength separator 123 and the third wavelength band overlap with each other. The wavelength band of electromagnetic waves detected by the second detector 140 may coincide with the wavelength band in which the wavelength band of electromagnetic waves reflected by the wavelength separator 123 and the third wavelength band overlap with each other. Thus, the second detector 140 detects electromagnetic waves in the wavelength band in which the wavelength band of electromagnetic waves reflected by the wavelength separator 123 and the third wavelength band overlap with each other.

By limiting the wavelength band of electromagnetic waves to be incident on the second detector 140 using the wavelength separator 123 and the wavelength selector 124a serving as filters, a higher transmittance and a steeper spectral characteristics can be obtained, as compared to those in a case in which a wavelength band of electromagnetic waves to be incident on the second detector 140 is limited using a bandpass filter. Thus, the electromagnetic wave detection apparatus 107 according to the present embodiment can suppress a reduction in the light receiving S/N ratio of the second detector 140 and a reduction in the level of the light receiving signal, whereby the second detector 140 can obtain a light receiving signal in good condition.

Figure 34:
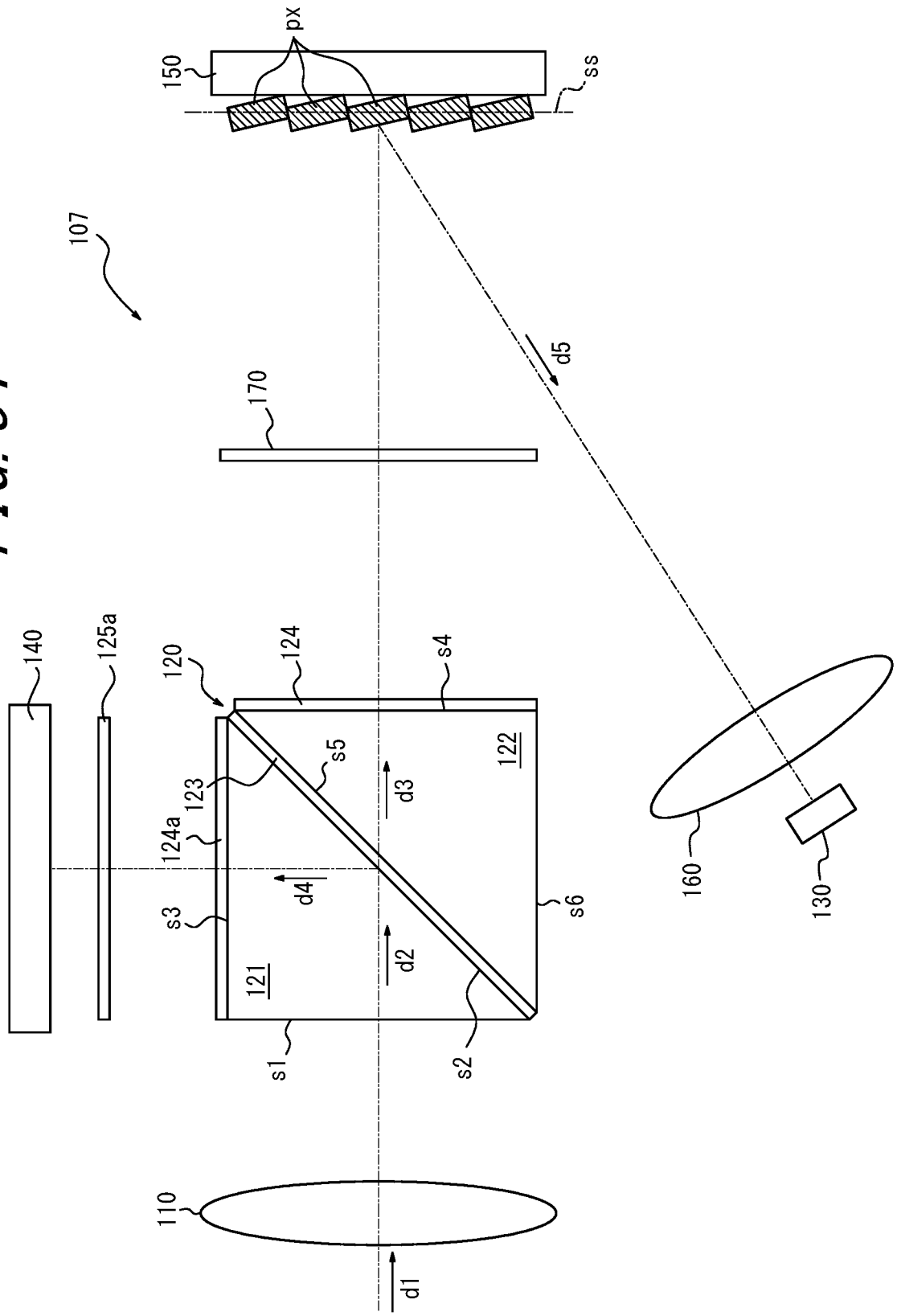
FIG. 34 is a diagram illustrating another example of the schematic configuration of the electromagnetic wave detection apparatus according to the eighth embodiment of the present disclosure.

The configuration of the electromagnetic wave detection apparatus 107 according to the present embodiment is not limited to the configuration illustrated in FIG. 33. For example, the electromagnetic wave detection apparatus 107 according to the present embodiment may include an infrared cut-off filter 125a as illustrated in FIG. 34.

The infrared cut-off filter 125a serving as a sixth transmission unit is arranged in a rear stage of the wavelength selector 124a. In particular, the infrared cut-off filter 125a is arranged between the wavelength selector 124a and the second detector 140. The infrared cut-off filter 125a transmits electromagnetic waves transmitted through the wavelength selector 124a after being reflected by the wavelength separator 123.

Here, the infrared cut-off filter 125a has a transmittance of electromagnetic waves in the first wavelength band smaller than that of the wavelength separator 123, and a transmittance of electromagnetic waves in a wavelength band other than the third wavelength band smaller than that of the wavelength selector 124a. Thus, the infrared cut-off filter 125a cuts off electromagnetic waves in the first wavelength band and electromagnetic waves in a wavelength band other than the third wavelength band, from among electromagnetic waves transmitted through the wavelength selector 124a after being reflected by the wavelength separator 123.

Alternatively, the infrared cut-off filter 125a has a transmittance of electromagnetic waves in the first wavelength band smaller than that of the wavelength separator 123, or a transmittance of electromagnetic waves in a wavelength band other than the third wavelength band smaller than that of the wavelength selector 124a. Thus, the infrared cut-off filter 125a cuts off electromagnetic waves in the first wavelength band or electromagnetic waves in a wavelength band other than the third wavelength band, from among electromagnetic waves transmitted through the wavelength selector 124a after being reflected by the wavelength separator 123.

By providing the infrared cut-off filter 125a as described above, the electromagnetic wave detection apparatus 107 according to the present embodiment can further suppress unnecessary light from being incident on the second detector 140 and improve the light receiving S/N ratio, whereby the second detector 140 can obtain a light receiving signal in further good condition.

Figure 35:
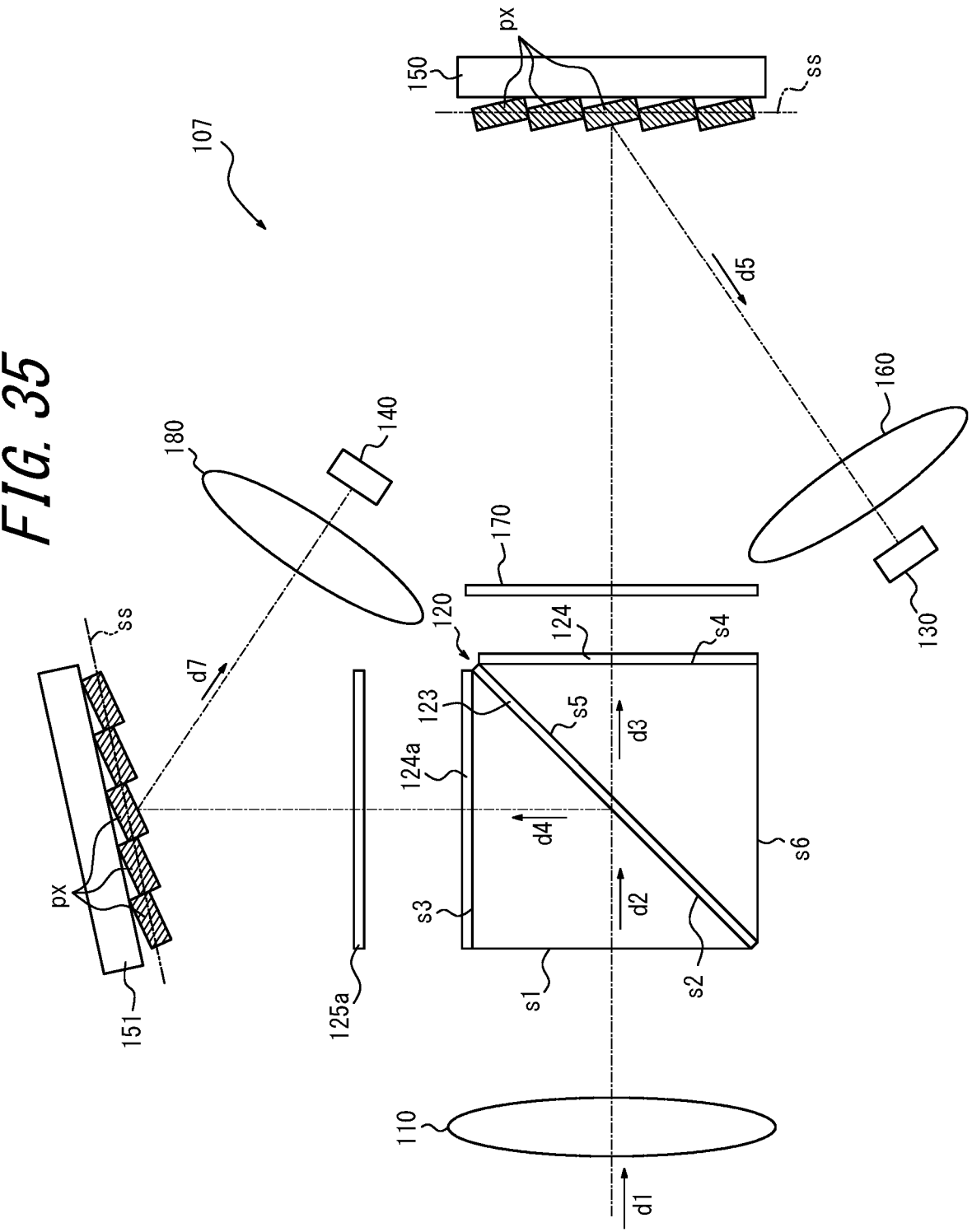
FIG. 35 is a diagram illustrating still another example of the schematic configuration of the electromagnetic wave detection apparatus according to the eighth embodiment of the present disclosure.

The configuration of the electromagnetic wave detection apparatus 107 according to the present embodiment is not limited to the configurations illustrated in FIG. 33 and FIG. 34. For example, the electromagnetic wave detection apparatus 107 according to the present embodiment may include a second progression unit 151 and a third image forming unit 180, as illustrated in FIG. 35.

The configuration and function of the second progression unit 151 are the same as those of the first progression unit 150. The second progression unit 151 causes the electromagnetic waves transmitted through the infrared cut-off filter 125a to progress in a seventh direction d7.

The third image forming unit 180 may be provided on a path of electromagnetic waves that are caused to progress in the seventh direction d7 by the second progression unit 151. The third image forming unit 180 includes at least one of, for example, a lens and a mirror. The third image forming unit 180 may cause an image of the object ob as electromagnetic waves progressing in the seventh direction d7 to progress to the second detector 140 for image formation.

In the present embodiment, a visible light cut-off filter may be arranged in place of the infrared cut-off filter 125a. That is, the sixth transmission unit includes an infrared cut-off filter or a visible light cut-off filter.

Although the present disclosure has been described based on the drawings and embodiments, it should be appreciated that those who are skilled in the art may easily perform variations or alterations based on the present disclosure. Accordingly, such variations and alterations are to be included in the scope of the present disclosure.

For example, in the first to eighth embodiments, the radiation unit 12, the scanner 13, and the controller 14 constitute the information acquisition system 11, together with the electromagnetic wave detection apparatus 100, 101, 102, 103, 104, 105, 106, or 107. However, the electromagnetic wave detection apparatus 100, 101, 102, 103, 104, 105, 106, and 107 may be configured including at least one of them.

Figure 36:
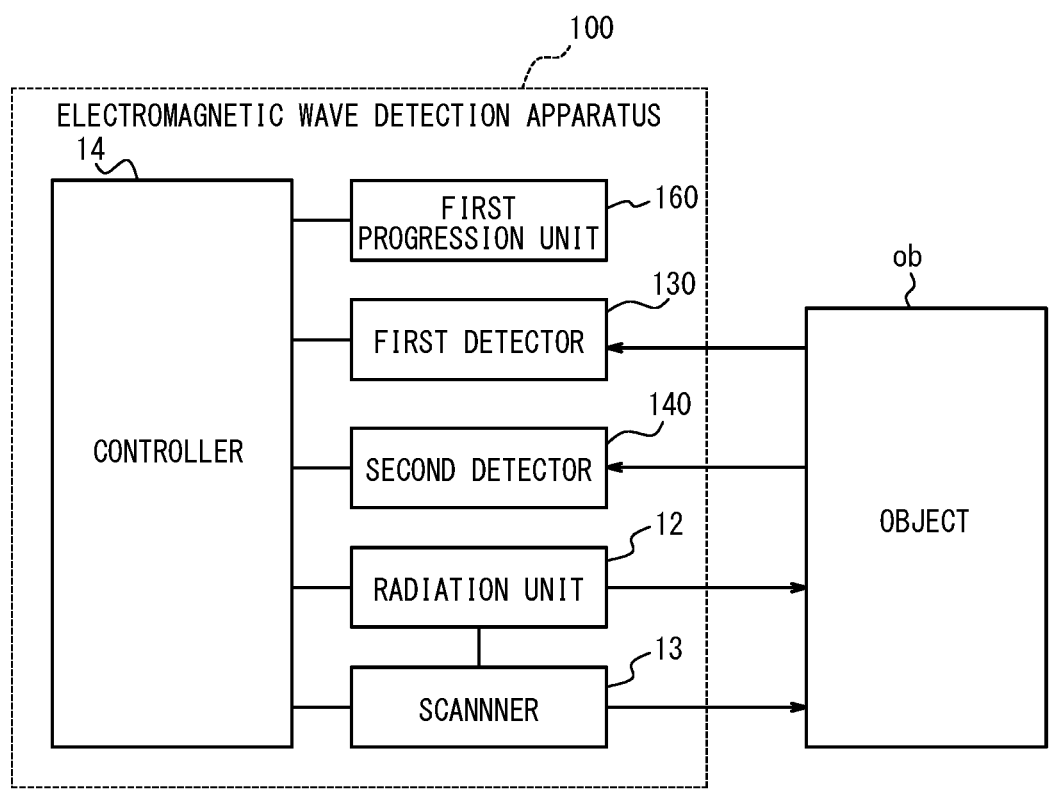
FIG. 36 is a diagram illustrating another example of the configuration of the electromagnetic wave detection apparatus according to the first embodiment of the present disclosure.

Thus, for example, the electromagnetic wave detection apparatus 100 according to the first embodiment described with reference to FIG. 6 that includes the first progression unit 150 may include the radiation unit 12, the scanner 13, and the controller 14, as illustrated in FIG. 36. Similarly, the electromagnetic wave detection apparatus 101, 102, 103, 104, 105, 106, and 107 according to the second to eighth embodiments may respectively include the radiation unit 12, the scanner 13, and the controller 14.

Although in the first to eighth embodiments the first progression unit 150 can switch the progression direction of electromagnetic waves incident on the reference surface ss in the two directions: the first selection direction ds1 and the second selection direction ds2, the first progression unit 150 can switch the progression direction between three or more directions.

Although in the first to eighth embodiments the first state and the second state of the first progression unit 150 are respectively the first reflection state for reflecting electromagnetic waves incident on the reference surface ss in the first selection direction ds1 and the second reflection state for reflecting the electromagnetic waves in the second selection direction ds2, these states may refer to other conditions.

For example, the second state may refer to a transmitting state in which electromagnetic waves incident on the reference surface ss are transmitted through and caused to progress in the second selection direction ds2. The first progression unit 150 may include a shutter that is provided for each of the pixels px and has a reflection surface for reflecting electromagnetic waves in the first selection direction ds1. The first progression unit 150 having this configuration can switch between the reflection state serving as the first state and the transmission state serving as the second state, by opening or closing the shutter for each of the pixels px.

The first progression unit 150 may be, for example, a progression unit that includes a MEMS shutter in which a plurality of shutters capable of opening and closing are arranged in an array. The first progression unit 150 may be a progression unit that includes a liquid crystal shutter capable of switching between a reflection state for reflecting electromagnetic waves and a transmission state for transmitting electromagnetic waves according to a liquid crystal alignment. The first progression unit 150 having such a configuration can switch between the reflection state serving as the first state and the transmission state serving as the second state for each of the pixels px by switching the liquid crystal alignment for each of the pixels px.

Further, in the first to eighth embodiments, the information acquisition system 11 has a configuration in which the scanner 13 is caused to scan a beam of electromagnetic waves radiated from the radiation unit 12 and causes the first detector 130 to function as a scanning type active sensor in cooperation with the scanner 13. However, the information acquisition system 11 is not limited to such a configuration. For example, the information acquisition system 11 may have a configuration in which the scanner 13 is omitted and the radiation unit 12 including a plurality of radiation sources capable of radiating radial electromagnetic waves functions as a scanning type active sensor using a phased-scanning method for radiating electromagnetic waves from each of the radiation sources at phased radiation timings. The information acquisition system 11 may have a configuration in which the scanner 13 is omitted, the radiation unit 12 radiates radial electromagnetic waves, and information is acquired without scanning.

In the first to eighth embodiments, further, the information acquisition system 11 has a configuration in which the first detector 130 is an active sensor and the second detector 140 is a passive sensor. However, the information acquisition system 11 is not limited to such a configuration. For example, the information acquisition system 11 may have a configuration in which both the first detector 130 and the second detector 140 serve as active sensors. In such a configuration in which both the first detector 130 and the second detector 140 serve as active sensors, either the radiation unit 12 or respective radiation units 12 may radiate electromagnetic waves to the object ob. Further, the respective radiation units 12 may radiate electromagnetic waves of the same type or different types.

REFERENCE SIGNS LIST 100-107 electromagnetic wave detection apparatus
11 information acquisition system
12 radiation unit
13 scanner
14 controller
110 first image forming unit
120, 120a prism
121 first prism
122, 122a second prism
123 wavelength separator
124, 124a wavelength selector
125, 125a infrared cut-off filter
130 first detector
140 second detector
150 first progression unit
151 second progression unit
160 second image forming unit
170 visible light cut-off filter
180 third image forming unit
900 electromagnetic wave detection apparatus
911 bandpass filter
912 first image forming unit
913 prism
914 progression unit
915 second image forming unit
916 detector
d1, d2, d3, d4, d5, d6, d7 first direction, second direction, third direction, fourth direction, fifth direction, sixth direction, seventh direction
s1 first surface
s2 second surface
s3 third surface
s4, s46 fourth surface
s5, s56 fifth surface
s6, s66 sixth surface
ob object
px pixel
ss reference surface

The invention claimed is:

1. An electromagnetic wave detection apparatus comprising:
    a first transmission unit having a transmittance of electromagnetic waves in a first wavelength band larger than a transmittance of electromagnetic waves in a wavelength band other than the first wavelength band;
    a second transmission unit having a transmittance of electromagnetic waves in a second wavelength band larger than a transmittance of electromagnetic waves in a wavelength band other than the second wavelength band;
    a third transmission unit having a transmittance of electromagnetic waves smaller than that of the first transmission unit in the wavelength band other than the first wavelength band or a transmittance of electromagnetic waves smaller than that of the second transmission unit in the wavelength band other than the second wavelength band; and
    a first detector configured to detect electromagnetic waves progressing via the first transmission unit, the second transmission unit, and the third transmission unit,
    wherein the first wavelength band and the second wavelength band partially overlap with each other, and
    the third transmission unit transmits electromagnetic waves having been transmitted through the first transmission unit and the second transmission unit.

2. The electromagnetic wave detection apparatus according to claim 1,
    wherein a wavelength band in which the first wavelength band and the second wavelength band overlap with each other and a wavelength band of electromagnetic waves detected by the first detector at least partially overlap with each other.

3. The electromagnetic wave detection apparatus according to claim 1,
    wherein the first detector is configured to detect electromagnetic waves sequentially transmitted through the first transmission unit and the second transmission unit.

4. The electromagnetic wave detection apparatus according to claim 1,
    wherein the first transmission unit reflects electromagnetic waves in a wavelength band other than the first wavelength band, and
    the first detector is configured to detect electromagnetic waves transmitted through the second transmission unit after being reflected by the first transmission unit.

5. The electromagnetic wave detection apparatus according to claim 1,
    wherein the transmittance of electromagnetic waves of the third transmission unit in the wavelength band other than the first wavelength band is smaller than that of the first transmission unit, and
    the transmittance of electromagnetic waves of the third transmission unit in the wavelength band other than the second wavelength band is smaller than that of the second transmission unit.

6. The electromagnetic wave detection apparatus according to claim 1,
    further comprising a first progression unit that includes a plurality of pixels arranged along a reference surface and is configured to cause electromagnetic waves incident on the reference surface via the first transmission unit to progress in a particular direction using each of the pixels,
    wherein the first detector is configured to detect electromagnetic waves progressing in the particular direction.

7. The electromagnetic wave detection apparatus according to claim 6,
    further comprising a first emission surface that emits electromagnetic waves progressing via the first transmission unit to the reference surface and receives electromagnetic waves re-incident from the reference surface after progressing in the particular direction; and
    a second emission surface that emits the re-incident electromagnetic waves, wherein the first detector is configured to detect electromagnetic waves emitted from the second emission surface.

8. The electromagnetic wave detection apparatus according to claim 7,
wherein the second transmission unit is arranged between the first emission surface and the first progression unit or between the second emission surface and the first detector.

9. The electromagnetic wave detection apparatus according to claim 6,
wherein the first progression unit switches each of pixels between a first reflection state in which electromagnetic waves incident on the reference surface are reflected in the particular direction and a second reflection state in which the electromagnetic waves are reflected in a direction different from the particular direction.

10. The electromagnetic wave detection apparatus according to claim 1,
wherein the first transmission unit has a reflectance of electromagnetic waves in a wavelength band other than the first wavelength band higher than a reflectance of electromagnetic waves in the first wavelength band.

11. The electromagnetic wave detection apparatus according to claim 1,
further comprising a radiation unit configured to radiate electromagnetic waves with object;
a first image forming unit configured to cause electromagnetic waves including reflected waves that electromagnetic waves radiated from the radiation unit is reflected by the object, to be incident on the first transmission unit;
a second detector configured to detect visible light and generate image information; and
a controller configured to measure a distance to the object based on a detection result of the reflected waves by a first detector,
wherein the first transmission unit is a long pass filter for transmitting electromagnetic waves in a wavelength band on a longer wavelength side from a first cutoff frequency among incident electromagnetic waves, thereby progressing electromagnetic waves in at least the first wavelength band to the second transmission unit, and for progressing electromagnetic waves other than at least the first wavelength band to the second detector,
the second transmission unit is a short pass filter for transmitting electromagnetic waves in a wavelength band on a shorter wavelength side from a second cutoff frequency having a wavelength longer that the first cutoff frequency among incident electromagnetic waves,
the first detector is arranged to detect electromagnetic waves transmitted by the second transmission unit, and
the radiation unit radiates electromagnetic waves having a wavelength between the first cutoff frequency and the second cutoff frequency.

12. The electromagnetic wave detection apparatus according to claim 11,
further comprising a scanner configured to scan the object with electromagnetic waves radiated from the radiation unit,
wherein the controller acquires an irradiation position of the electromagnetic waves based on a radiation direction of electromagnetic waves by the scanner, and acquires a distance to the irradiation position.

13. The electromagnetic wave detection apparatus according to claim 12,
further comprising a progression unit that includes a plurality of pixels arranged on a reference surface and is configured to switch each of pixels between a first state in which electromagnetic waves incident from the second transmission unit to the reference surface are caused to progress to the first detector and a second state in which electromagnetic waves incident from the second transmission unit to the reference surface are not caused to progress to the first detector, and
the progression unit switched each of the plurality of pixels between the first state and the second state, and cause to progress the reflected waves to the first detector.

14. The electromagnetic wave detection apparatus according to claim 11, wherein
the electromagnetic waves radiated by the radiation unit include ultraviolet waves.

\* \* \* \* \*